US008161268B2

(12) United States Patent
Faraj

(10) Patent No.: US 8,161,268 B2
(45) Date of Patent: Apr. 17, 2012

(54) PERFORMING AN ALLREDUCE OPERATION ON A PLURALITY OF COMPUTE NODES OF A PARALLEL COMPUTER

(75) Inventor: Ahmad Faraj, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 12/124,756

(22) Filed: May 21, 2008

(65) Prior Publication Data

US 2009/0307467 A1 Dec. 10, 2009

(51) Int. Cl.
*G06F 15/80* (2006.01)
*G06F 9/30* (2006.01)
*G06F 9/302* (2006.01)

(52) U.S. Cl. .......................................... 712/30; 712/221
(58) Field of Classification Search ................ 712/30, 712/229, 221
See application file for complete search history.

(56) References Cited

U.S. PATENT DOCUMENTS

| 4,715,032 A | 12/1987 | Nilsson |
| 4,843,540 A | 6/1989 | Stolfo |
| 5,105,424 A | 4/1992 | Flaig et al. |
| 5,333,279 A | 7/1994 | Dunning |
| 5,513,371 A | 4/1996 | Cypher et al. |
| 5,541,914 A | 7/1996 | Krishnamoorthy et al. |
| 5,617,538 A | 4/1997 | Heller |
| 5,721,828 A | 2/1998 | Frisch |
| 5,822,604 A | 10/1998 | Ogasawara et al. |
| 5,832,215 A | 11/1998 | Kato et al. |
| 5,864,712 A | 1/1999 | Carmichael et al. |
| 5,878,241 A | 3/1999 | Wilkinson et al. |
| 5,892,923 A | 4/1999 | Yasuda et al. |
| 5,937,202 A | 8/1999 | Crosetto et al. |
| 5,949,988 A | 9/1999 | Feisullin et al. |
| 5,958,017 A | 9/1999 | Scott et al. |
| 6,000,024 A | 12/1999 | Maddox et al. |
| 6,067,609 A | 5/2000 | Meeker et al. |
| 6,076,131 A | 6/2000 | Nugent |

(Continued)

FOREIGN PATENT DOCUMENTS

EP 1835414 A2 9/2007

OTHER PUBLICATIONS

Eunseuk Oh, An All-Reduce Operation in Star Networks Using All-to-All Broadcast Communication Patterns, 2005, 1-8.*

(Continued)

*Primary Examiner* — Aimee Li
(74) *Attorney, Agent, or Firm* — Biggers & Ohanian, LLP

(57) ABSTRACT

Methods, apparatus, and products are disclosed for performing an allreduce operation on a plurality of compute nodes of a parallel computer. Each compute node includes at least two processing cores. Each processing core has contribution data for the allreduce operation. Performing an allreduce operation on a plurality of compute nodes of a parallel computer includes: establishing one or more logical rings among the compute nodes, each logical ring including at least one processing core from each compute node; performing, for each logical ring, a global allreduce operation using the contribution data for the processing cores included in that logical ring, yielding a global allreduce result for each processing core included in that logical ring; and performing, for each compute node, a local allreduce operation using the global allreduce results for each processing core on that compute node.

18 Claims, 13 Drawing Sheets

U.S. PATENT DOCUMENTS

| | | | |
|---|---|---|---|
| 6,212,617 | B1 | 4/2001 | Hardwick |
| 6,272,548 | B1 | 8/2001 | Cotter et al. |
| 6,289,424 | B1 | 9/2001 | Stevens |
| 6,292,822 | B1 | 9/2001 | Hardwick |
| 6,334,138 | B1 | 12/2001 | Kureya |
| 6,480,885 | B1 | 11/2002 | Olivier |
| 6,714,552 | B1 | 3/2004 | Cotter |
| 6,742,063 | B1 | 5/2004 | Hellum et al. |
| 6,754,211 | B1 | 6/2004 | Brown |
| 6,914,606 | B2 | 7/2005 | Amemiya et al. |
| 7,133,359 | B2 | 11/2006 | Weis |
| 7,263,598 | B2 * | 8/2007 | Ambuel ............... 712/34 |
| 7,284,033 | B2 | 10/2007 | Jhanji |
| 7,496,699 | B2 | 2/2009 | Pope et al. |
| 7,539,989 | B2 | 5/2009 | Blackmore et al. |
| 7,664,110 | B1 | 2/2010 | Lovett et al. |
| 7,853,639 | B2 | 12/2010 | Archer et al. |
| 2002/0016901 | A1 | 2/2002 | Carvey et al. |
| 2002/0054051 | A1 | 5/2002 | Ladd |
| 2002/0065984 | A1 | 5/2002 | Thompson et al. |
| 2002/0144027 | A1 | 10/2002 | Schmisseur |
| 2003/0188054 | A1 | 10/2003 | Yosimoto et al. |
| 2003/0212877 | A1 * | 11/2003 | Dally et al. ............ 712/12 |
| 2004/0034678 | A1 | 2/2004 | Kuszmaul et al. |
| 2004/0073590 | A1 | 4/2004 | Bhanot et al. |
| 2005/0094577 | A1 | 5/2005 | Ashwood-Smith |
| 2005/0165980 | A1 | 7/2005 | Clayton et al. |
| 2005/0243711 | A1 | 11/2005 | Alicherry et al. |
| 2006/0168359 | A1 | 7/2006 | Bissessur et al. |
| 2006/0179181 | A1 | 8/2006 | Seong |
| 2006/0277323 | A1 | 12/2006 | Joublin et al. |
| 2007/0110063 | A1 | 5/2007 | Tang et al. |
| 2007/0174558 | A1 | 7/2007 | Jia et al. |
| 2007/0242611 | A1 | 10/2007 | Archer et al. |
| 2007/0245122 | A1 | 10/2007 | Archer et al. |
| 2007/0288935 | A1 | 12/2007 | Tannenbaum et al. |
| 2008/0127146 | A1 | 5/2008 | Liao et al. |
| 2008/0301683 | A1 * | 12/2008 | Archer et al. ............ 718/102 |
| 2009/0006662 | A1 | 1/2009 | Chen et al. |
| 2009/0064176 | A1 * | 3/2009 | Ohly et al. ............ 719/313 |
| 2009/0067334 | A1 * | 3/2009 | Archer et al. ............ 370/238 |
| 2009/0154486 | A1 * | 6/2009 | Archer et al. ............ 370/445 |
| 2009/0196361 | A1 | 8/2009 | Chan et al. |
| 2009/0292905 | A1 | 11/2009 | Faraj |
| 2010/0122268 | A1 | 5/2010 | Jia |
| 2010/0185718 | A1 | 7/2010 | Archer et al. |
| 2011/0119673 | A1 | 5/2011 | Bloch et al. |

OTHER PUBLICATIONS

Xin Yuan, Bandwidth Efficient All-reduce Operation on Tree Topologies, 2007, 1-8.*

Patarasuk, et al.; Bandwidth Efficient All-Reduce Operation on Tree Topologies; 2007; pp. 1-8; Department of Computer Science, Florida State University; Tallahassee, FL; US.

Sunggu Lee; Shin, K.G., "Interleaved all-to-all reliable broadcast on meshes and hypercubes," Parallel and Distributed Systems, IEEE Transactions on, vol. 5, pp. 449-458, May 1994.

Wikipedia. "Depth-First Search" May 5, 2007. http://web.archive.org/web/20070505212029/http://en.wikipedia.org/wiki/Depth-first_Search.

Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.

U.S. Appl. 60/271,124, filed Feb. 24, 2001, pp. 12-13, 27 and 42-43.

Sistare, et al.; Optimization of MPI collectives on clusters of large-scale SMP's, Conference on High Performance Networking and Computing, Proceedings of the 1999 ACM/IEEE conference on Supercomputing; 1999.

Tanenbaum, Structured Computer Organization, Second Edition, Prentice-Hall, Inc., 1984.

Rosenberg; Dictionarty of Computers, Information Processing & Telecommunications, Second Edition, John Wiley & Sons, 1987.

Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.

Fisher, et al.; "Computing The Hough Transform on a Scar Line Array Processor"; IEEE Transactions on Pattern Analysis and Machine Intelligence; vol. II, No. 3; Mar. 1989; pp. 262-265.

Office Action U.S. Appl. No. 11/279,620, Mar. 4, 2008.

Office Action U.S. Appl. No. 11/279,620, Sep. 3, 2008.

Office Action U.S. Appl. No. 11/279,620, Dec. 29, 2008.

Office Action U.S. Appl. No. 11/769,367, Apr. 3, 2009.

Office Action U.S. Appl. No. 11/459,387, Dec. 13, 2007.

Office Action U.S. Appl. No. 11/459,387, Jul. 11, 2008.

Office Action U.S. Appl. No. 11/459,387, Mar. 18, 2009.

Office Action U.S. Appl. No. 11/737,286, Feb. 9, 2009.

Office Action U.S. Appl. No. 11/737,209, Jul. 20, 2009.

Office Action U.S. Appl. No. 11/843,090, Sep. 4, 2009.

M. Matsuda, T. Koduh, Y. Kodama, R. Takano, Y. Ishikawa, "Efficient MPI Collective Operations for Clusters in Long-and-Fast Networks," cluster, pp. 1-9, 2006 IEEE International Conference on Cluster Computing, Sep. 2006.

Dado: A Tree-Structured Machine Architecture for Production Systems, Stolfo et al. AAAI Proceedings, 1982, Columbia University.

Final Office Action U.S. Appl. No. 11/769,367, Sep. 28, 2010.

Final Office Action U.S. Appl. No. 12/053,842, Oct. 18, 2010.

Advisory Action U.S. Appl. No. 12/053,842, Jan. 11, 2011.

Office Action U.S. Appl. No. 12/053,842, Mar. 1, 2011.

Office Action U.S. Appl. No. 12/503,902, Oct. 6, 2010.

Office Action U.S. Appl. No. 12/060,492, May 27, 2010.

Final Office Action U.S. Appl. No. 12/060,492, Dec. 2, 2010.

Office Action U.S. Appl. No. 12/124,763, Oct. 14, 2010.

Office Action U.S. Appl. No. 12/124,756, Oct. 18, 2010.

Edmonds, "AM++: A Generalized Active Message Framework,"pp. 1-10, Sep. 2010.

Bangalore. "Extending the Message Passing Interface (MPI)", Proc. of the 1994 Conf. on Scalable Parallel Libraries, IEEE, pp. 106-118, 1995.

Bafna, "Coprocessor Design to Support MPI Primitives in Configurable Mutliprocessors;" *Integration, the VSLI Journal*, vol. 40 , Issue 3 , pp. 235-252, Apr. 2007.

Keller, Rainer; "MPI Development Tools and Applications for the Grid," Jun. 2003, pp. 1-12.

Tang, Hong; "Optimizing threaded MPI execution on SMP clusters," *International Conference on Supercomputer*, Jun. 2001, pp. 381-392.

Office Action U.S. Appl. No. 11/754,740, Apr. 11, 2011.

http://betterexplained.com/articles/swap-two-variables-using-xor, Jan. 16, 2007, betterexplained.com.

Office Action U.S. Appl. No. 11/754,782, Jun. 23, 2011.

Final Office Action U.S. Appl. No. 12/053,842, May 23, 2011.

Office Action U.S. Appl. No. 12/176,816, Jun. 10, 2011.

* cited by examiner

PERFORMING AN ALLREDUCE OPERATION ON A PLURALITY OF COMPUTE NODES OF A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for performing an allreduce operation on a plurality of compute nodes of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network generally supports point-to-point communications. A tree network, however, typically only supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. In the current art, however, the tree network does not lend itself to and is typically inefficient for point-to-point operations. Although in general the torus network and the tree network are each optimized for certain communications patterns, those communications patterns may be supported by either network.

One of the most common communications patterns utilized in a parallel computing application is an allreduce communication pattern. An allreduce communication pattern is a pattern in which: data contributed by each process is operated on using an operator such as, for example, an addition operator, multiplication operator, maximum operator, and so on; the results of the operation are then distributed back to all of the processes that contributed data. Currently, many different algorithms exist that efficiently implement an allreduce communications pattern on different platforms and network topologies. The drawback to these algorithms however is that the algorithms are typically designed for parallel computers in which each compute nodes only supports a single process for processing the parallel application. Such allreduce implementations do not operate efficiently on parallel computers in which each compute node supports multiple processes for processing the parallel application.

SUMMARY OF THE INVENTION

Methods, apparatus, and products are disclosed for performing an allreduce operation on a plurality of compute nodes of a parallel computer. Each compute node includes at least two processing cores. Each processing core has contribution data for the allreduce operation. Performing an allreduce operation on a plurality of compute nodes of a parallel computer includes: establishing one or more logical rings among the compute nodes, each logical ring including at least one processing core from each compute node; performing, for each logical ring, a global allreduce operation using the contribution data for the processing cores included in that logical ring, yielding a global allreduce result for each processing core included in that logical ring; and performing, for each compute node, a local allreduce operation using the global allreduce results for each processing core on that compute node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
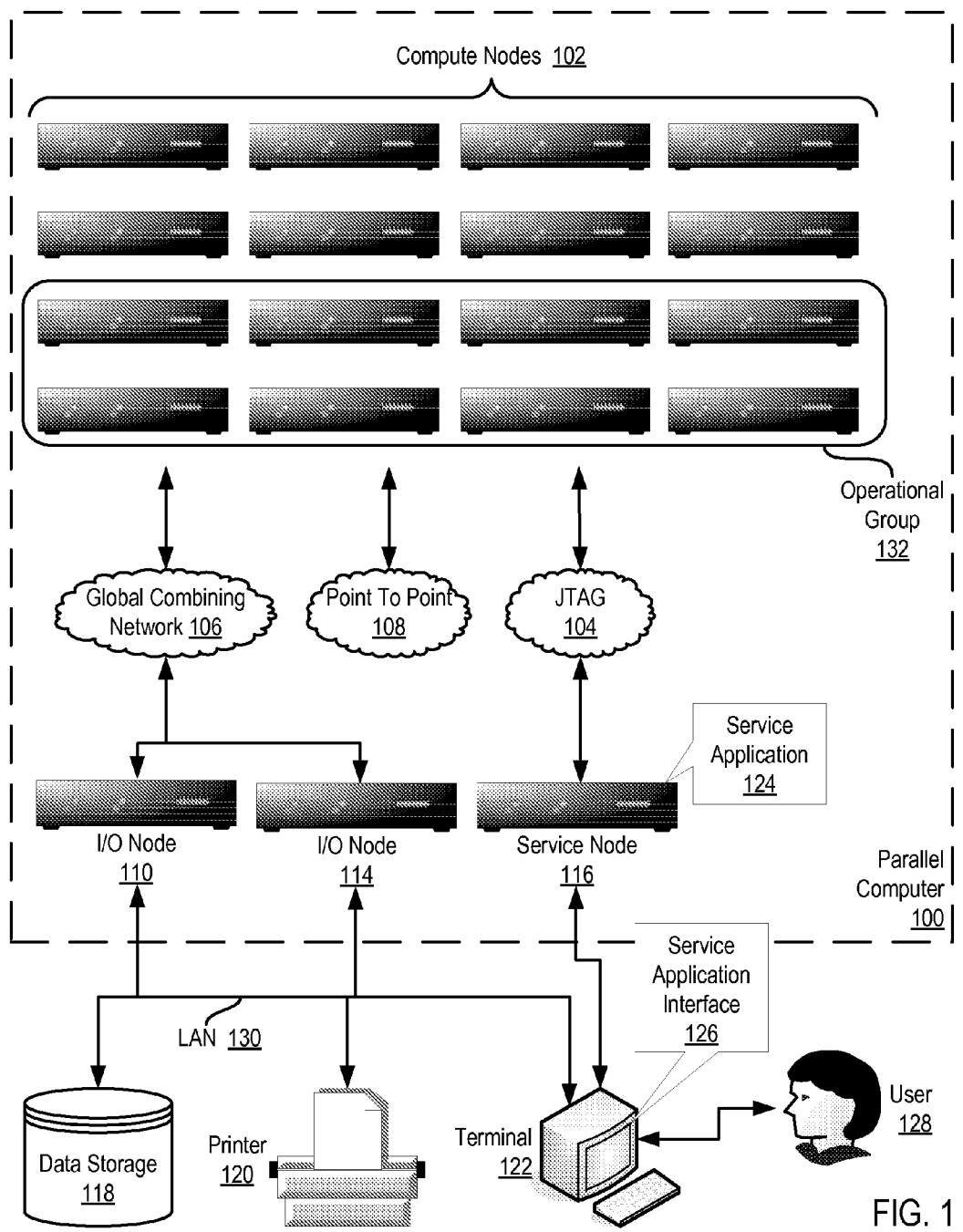
FIG. 1 illustrates an exemplary parallel computer for performing an allreduce operation on a plurality of compute nodes of a parallel computer according to embodiments of the present invention.

Exemplary methods, apparatus, and computer program products for performing an allreduce operation on a plurality of compute nodes of a parallel computer according to embodiments of the present invention are described with reference to the accompanying drawings, beginning with FIG. 1. FIG. 1 illustrates an exemplary parallel computer for performing an allreduce operation on a plurality of compute nodes of a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

Each compute node (102) includes a plurality of processing cores, or processors, for use in collective parallel operations on the parallel computer (100). The processing cores of each compute node (102) in FIG. 1 are operatively coupled to computer memory such as, for example, random access memory ('RAM'). Each compute node (102) may operate in several distinct modes that affect the relationship among the processing cores and the memory on that node such as, for example, serial processing mode or parallel processing mode. The mode in which the compute nodes (102) operate is generally set during the node's boot process and does not change until the node reboots.

In a serial processing mode, often referred to a 'virtual node mode,' the processing cores of a compute node operate independently of one another, and each processing core has access to a partition of the node's memory that is exclusively dedicated to that core. For example, if a compute node has four processors and two Gigabytes (GB) of RAM, when operating in serial processing mode, each processor may process a thread independently of the other processors on that node, and each processor may access a portion of that node's 2 GB of RAM.

In a parallel processing mode, often referred to as 'symmetric multiprocessing mode,' one of the processing cores acts as a master, and the remaining processing cores serve as slaves to the master core. Each processing core has access to the full range of computer memory on the compute node. Continuing with the exemplary node above having four processors and 2 GB of RAM, for example, each slave processor may cooperatively process threads spawned from the master core, and all of the processors have access to the node's entire 2 GB of RAM. Readers will note that the exemplary modes described above are for explanation only and not for limitation that each compute node may also operate in other modes as will occur to those of skill in the art.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with network links among the compute nodes (102). The network links provide data communications for parallel operations among the compute nodes of the parallel computer. The links between compute nodes are bidirectional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the processing core that distributes the data to all the other processing cores is an originating process. In a 'gather' operation, for example, the process on the processing core that received all the data from the other processing cores is a receiving process. The originating or receiving process or processing core or the compute node on which such an originating or receiving process runs may be referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node or processing core is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the various processes running on the ranked compute nodes or cores into a receive buffer for the logical root.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

As mentioned above, most collective operation communications patterns build off of these basic collective operations. One such communications pattern is a gossiping communications pattern in which one set of compute nodes communicates with another set of compute nodes. The two sets of nodes participating in the gossip communications pattern could be the same or different. Examples of gossiping communications patterns implemented using MPI may include an all-to-all operation, an all-to-allv operation, an allgather operation, an allgatherv operation, and so on.

In addition to compute nodes, the parallel computer (100) includes input/output ('I/O') nodes (110, 114) coupled to compute nodes (102) through the global combining network (106). The I/O nodes (110, 114) provide I/O services between compute nodes (102) and I/O devices (118, 120, 122). I/O nodes (110, 114) are connected for data communications I/O devices (118, 120, 122) through local area network ('LAN') (130) implemented using high-speed Ethernet. The parallel computer (100) also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) of FIG. 1 includes computer program instructions for performing an allreduce operation on a plurality of compute nodes of the parallel computer according to embodiments of the present invention. The parallel computer (100) of FIG. 1 operates generally for performing an allreduce operation on a plurality of compute nodes of the parallel computer according to embodiments of the present invention by: establishing one or more logical rings among the compute nodes (102), each logical ring including at least one processing core from each compute node (102); performing, for each logical ring, a global allreduce operation using the contribution data for the processing cores included in that logical ring, yielding a global allreduce result for each processing core included in that logical ring; and performing, for each compute node (102), a local allreduce operation using the global allreduce results for each processing core on that compute node (102).

A logical ring topology is a network topology in which each of the processing cores in the parallel computer is logically connected to at least one other processing core such that the first and last processing cores are connected to each other, forming a ring. All data that is transmitted between processing cores travels from one core to the next core in a circular manner, and the data typically only flows in a single direction. For a given logical ring, therefore, each processing core generally provides data to the same processing core along the logical ring and generally receives data from the same processing core along the logical ring. A logical ring topology is referred to as 'contention-free' when each physical network link connecting the processing cores in the logical ring topology is only used for data communications by a single pair of processing cores in one direction at a time.

The arrangement of nodes, networks, and I/O devices making up the exemplary system illustrated in FIG. 1 are for explanation only, not for limitation of the present invention. Data processing systems capable of performing an allreduce operation on a plurality of compute nodes of a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Performing an allreduce operation on a plurality of compute nodes of a parallel computer according to embodiments of the present invention may be generally implemented on a parallel computer that includes a plurality of compute nodes. In fact, such computers may include thousands of such compute nodes. Each compute node is in turn itself a kind of computer composed of a plurality of computer processors (or processing cores), its own computer memory, and its own input/output adapters. For further explanation, therefore, FIG. 2 sets forth a block diagram of an exemplary compute node useful in a parallel computer capable of performing an allreduce operation on a plurality of compute nodes of a parallel computer according to embodiments of the present invention. The compute node (152) of FIG. 2 includes a plurality of processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Computer program instructions for performing an allreduce operation on a plurality of compute nodes of a parallel computer according to embodiments of the present invention typically reside in the application (158) or the messaging module (160). Such instructions may operate generally for performing an allreduce operation on a plurality of compute nodes of a parallel computer according to embodiments of the present invention by: establishing one or more logical rings among the compute nodes, each logical ring including at least one processing core from each compute node; performing, for each logical ring, a global allreduce operation using the contribution data for the processing cores included in that logical ring, yielding a global allreduce result for each processing core included in that logical ring; and performing, for each compute node, a local allreduce operation using the global allreduce results for each processing core on that compute node.

Also stored in RAM (156) is an operating system (162), a module of computer program instructions and routines for controlling an application program's or messaging module's access to other resources of the compute node. The operating system (162) may be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
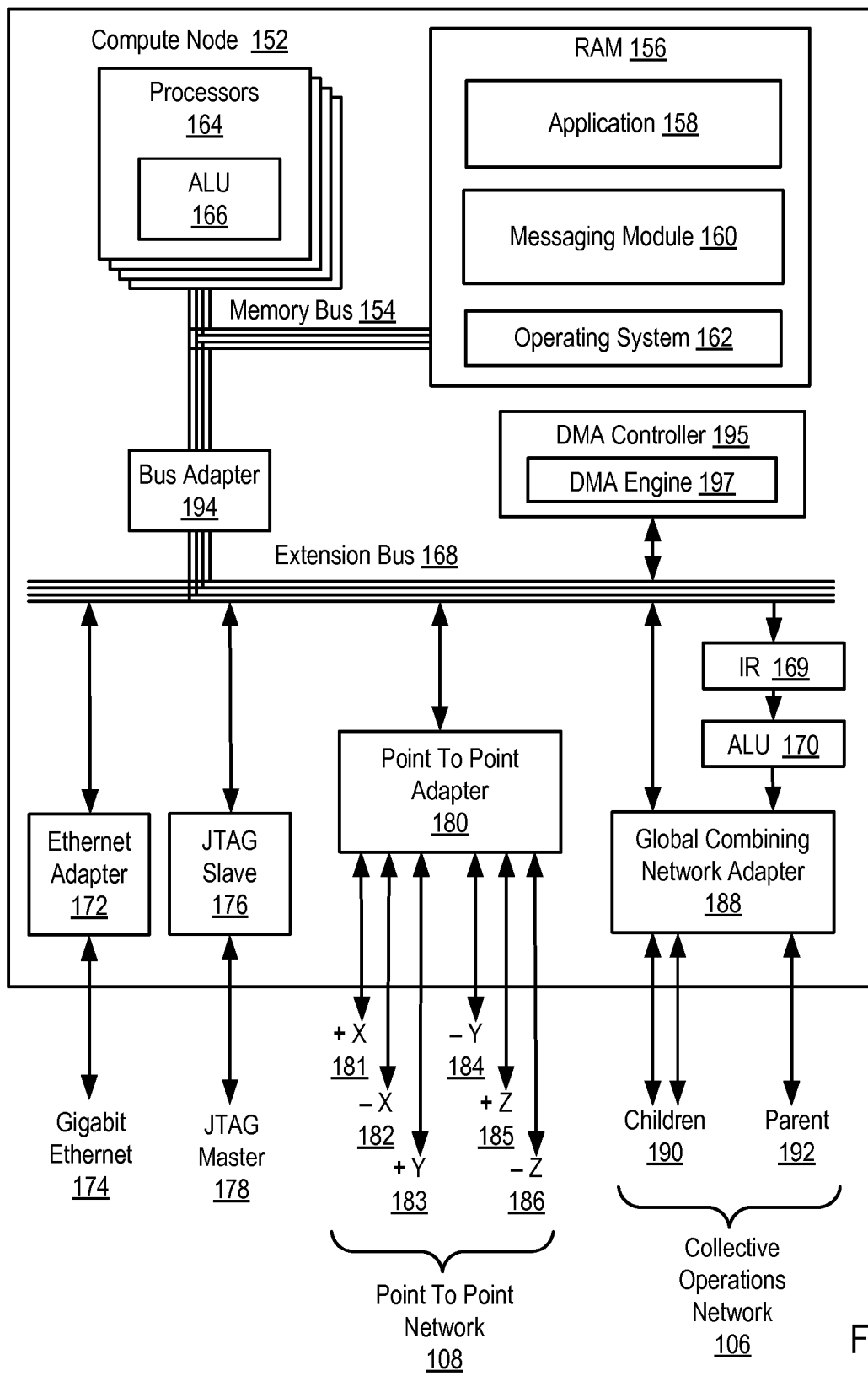
FIG. 2 sets forth a block diagram of an exemplary compute node useful in a parallel computer capable of performing an allreduce operation on a plurality of compute nodes of a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for performing an allreduce operation on a plurality of compute nodes of a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in performing an allreduce operation on a plurality of compute nodes of a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
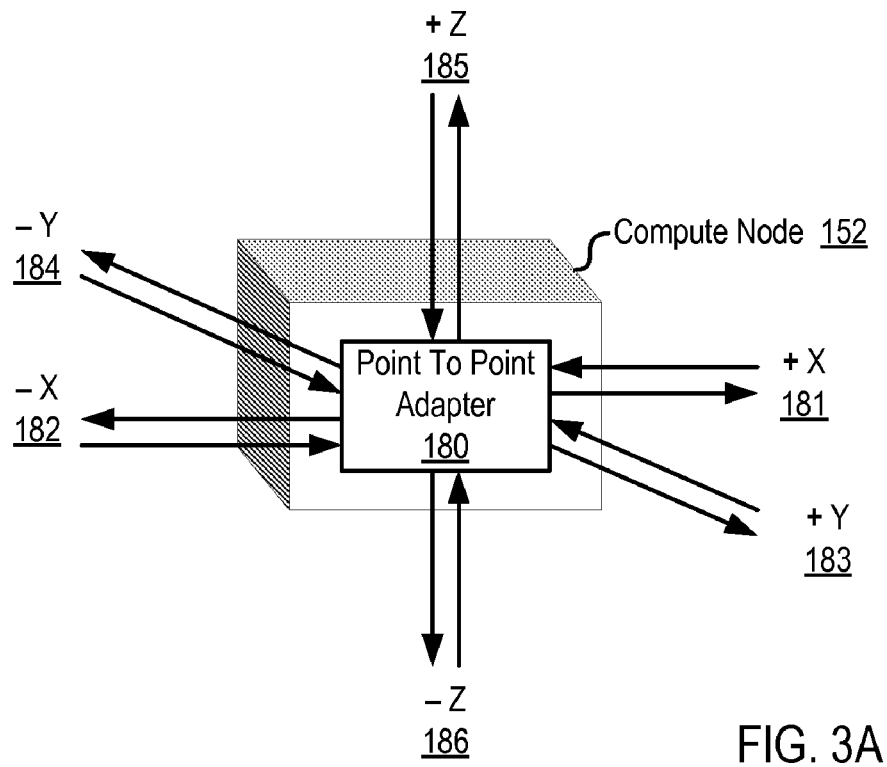
FIG. 3A illustrates an exemplary Point To Point Adapter useful in a parallel computer capable of performing an allreduce operation on a plurality of compute nodes of a parallel computer according to embodiments of the present invention.

For further explanation, FIG. 3A illustrates an exemplary Point To Point Adapter (180) useful in a parallel computer capable of performing an allreduce operation on a plurality of compute nodes of the parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
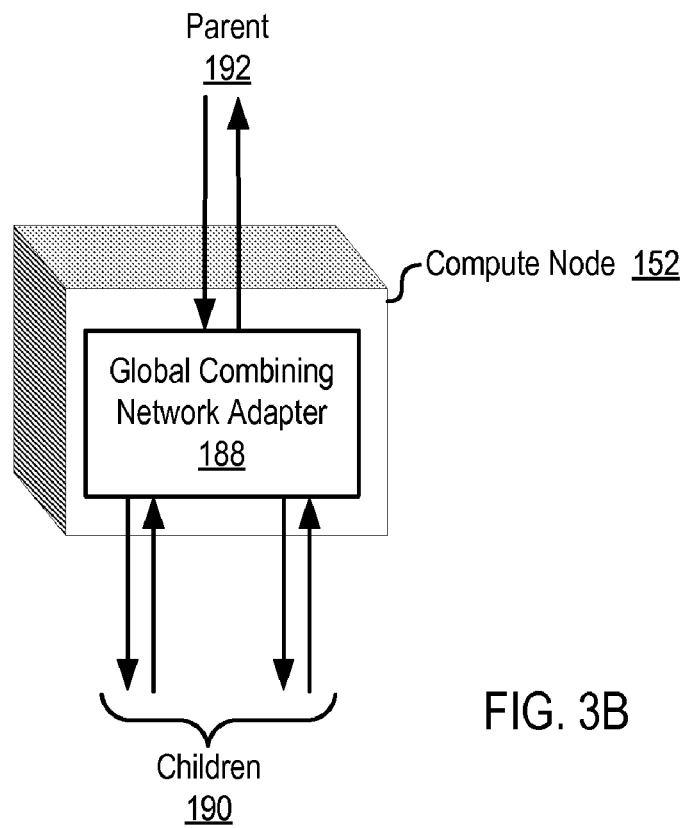
FIG. 3B illustrates an exemplary Global Combining Network Adapter useful in a parallel computer capable of performing an allreduce operation on a plurality of compute nodes of a parallel computer according to embodiments of the present invention.

For further explanation, FIG. 3B illustrates an exemplary Global Combining Network Adapter (188) useful in a parallel computer capable of performing an allreduce operation on a plurality of compute nodes of the parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link formed from two unidirectional data communications paths.

Figure 4:
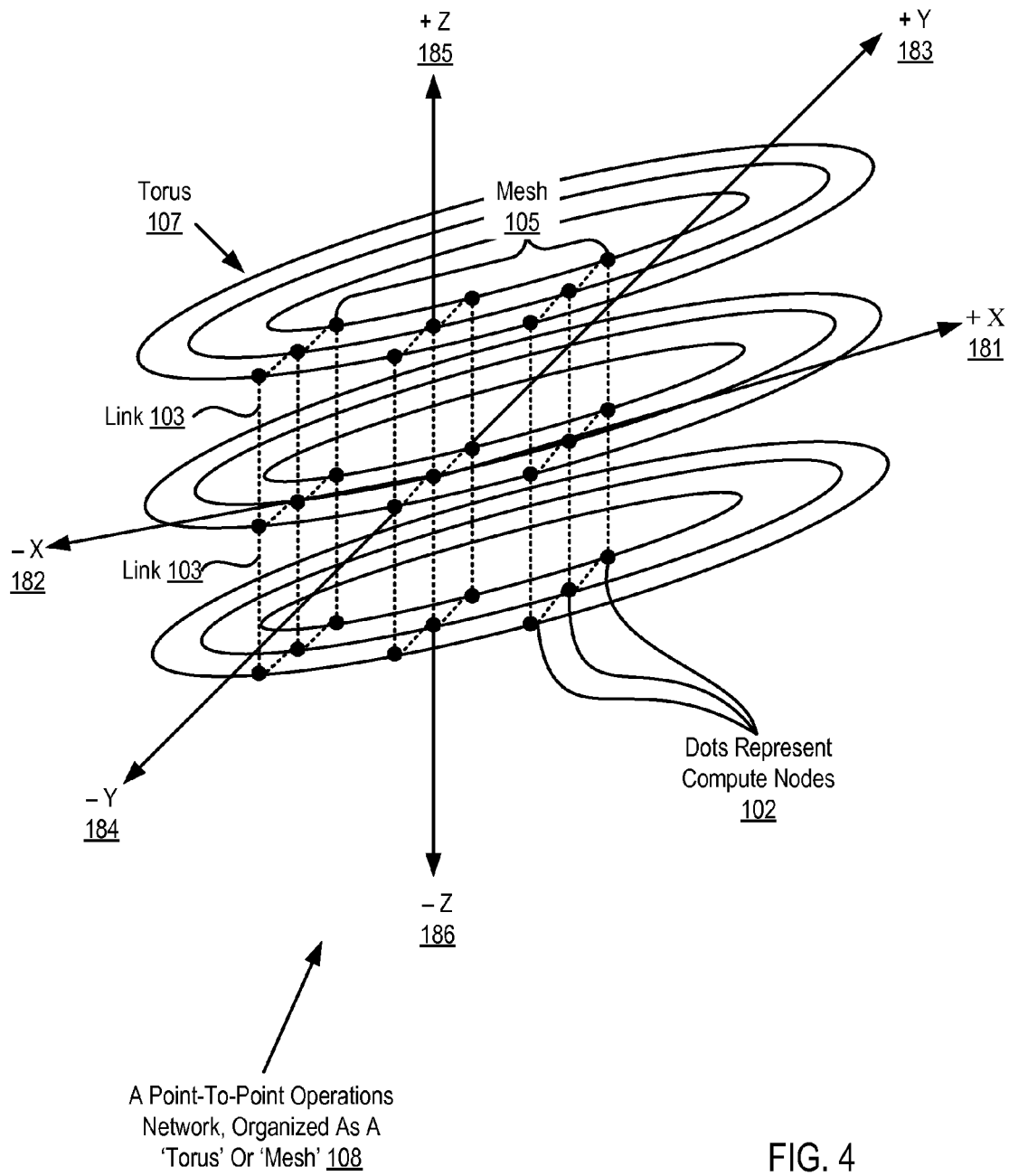
FIG. 4 sets forth a line drawing illustrating an exemplary data communications network optimized for point to point operations useful in a parallel computer capable of performing an allreduce operation on a plurality of compute nodes of a parallel computer according to embodiments of the present invention.

For further explanation, FIG. 4 sets forth a line drawing illustrating an exemplary data communications network (108) optimized for point to point operations useful in a parallel computer capable of performing an allreduce operation on a plurality of compute nodes of the parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in performing an allreduce operation on a plurality of compute nodes of a parallel computer in accordance with embodiments of the present invention may contain only a few compute nodes or may contain thousands of compute nodes.

Figure 5:
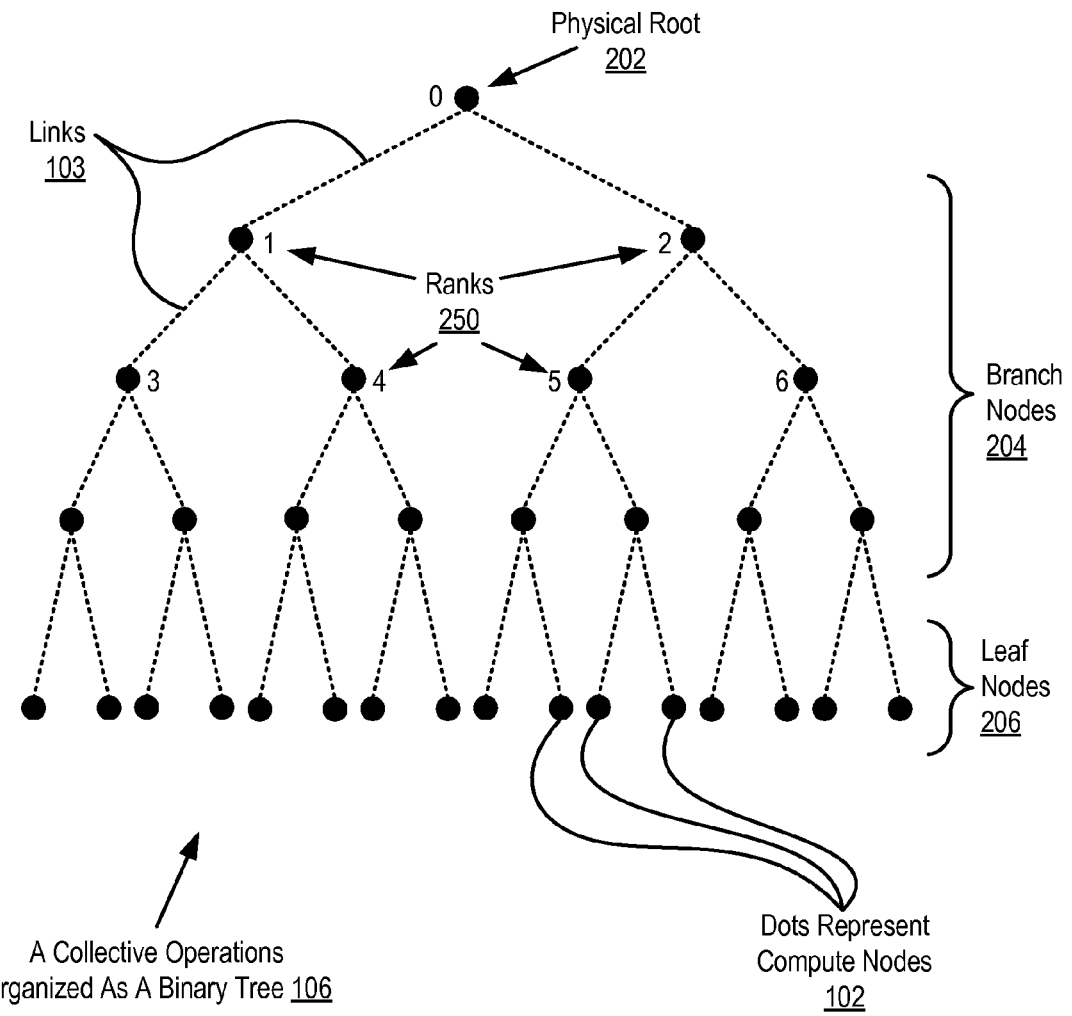
FIG. 5 sets forth a line drawing illustrating an exemplary data communications network optimized for collective operations useful in a parallel computer capable of performing an allreduce operation on a plurality of compute nodes of a parallel computer according to embodiments of the present invention.

For further explanation, FIG. 5 sets forth a line drawing illustrating an exemplary data communications network (106) optimized for collective operations useful in a parallel computer capable of performing an allreduce operation on a plurality of compute nodes of the parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for performing an allreduce operation on a plurality of compute nodes of the parallel computer in accordance with embodiments of the present invention may contain only a few compute nodes or may contain thousands of compute nodes. In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6A:
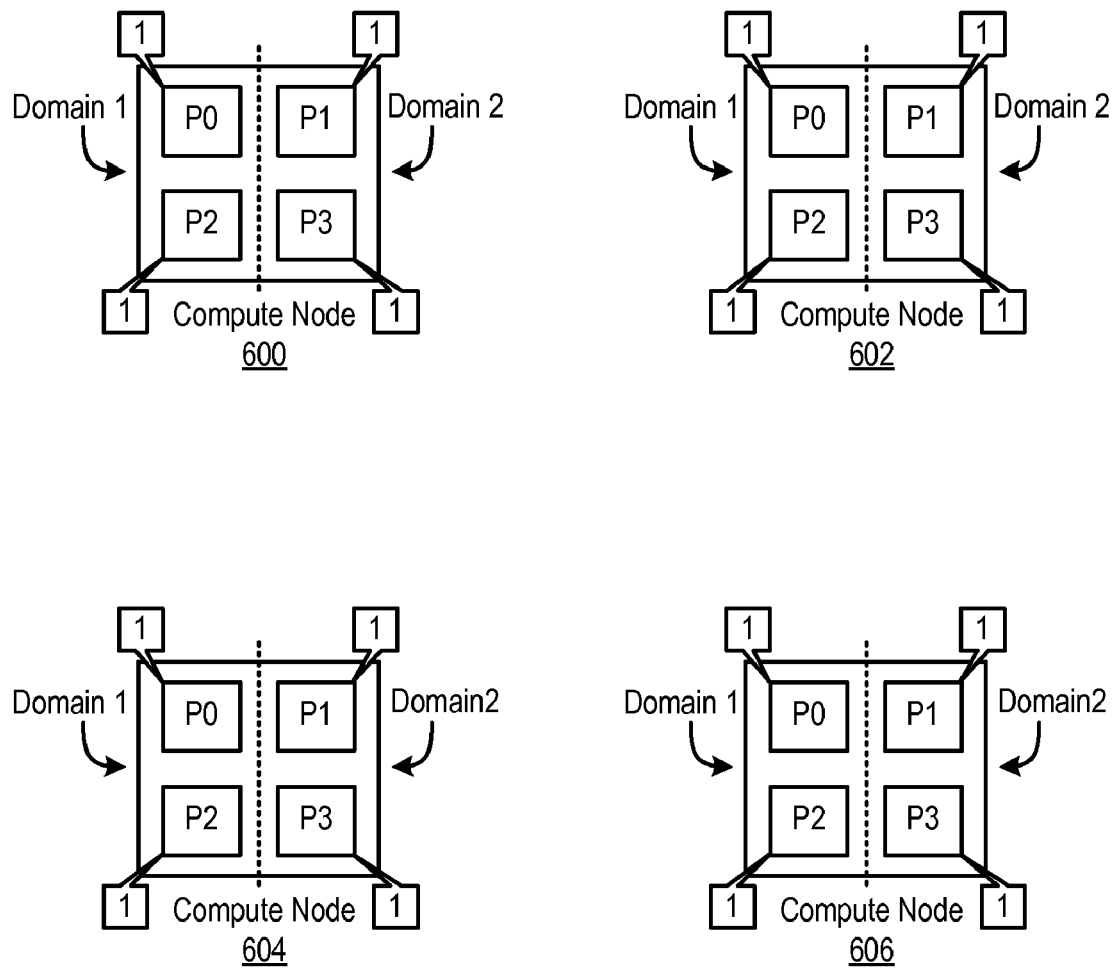
FIG. 6A sets forth a line drawing illustrating exemplary compute nodes of a parallel computer capable of performing an allreduce operation on a plurality of compute nodes of the parallel computer according to embodiments of the present invention.

For further explanation, FIG. 6A sets forth a line drawing illustrating exemplary compute nodes (600, 602, 604, 606) of a parallel computer capable of performing an allreduce operation on a plurality of compute nodes of the parallel computer according to embodiments of the present invention. The compute nodes (600, 602, 604, 606) are connected through a data communications network (not shown). Specifically, compute node (600) is connected to compute nodes (602, 604). Compute node (602) is connected to compute nodes (600, 606). Compute node (604) is connected to compute nodes (600, 606). Compute node (606) is connected to compute nodes (602, 604).

Each compute node (600, 602, 604, 606) has four processing cores P0, P1, P2, and P3 for use in performing collective parallel operations on the parallel computer. In the example of FIG. 6A, each processing core P0, P1, P2, and P3 of each compute node (600, 602, 604, 606) has its own contribution data for the allreduce operation. The contribution data is data that each processing core provides during the allreduce operation for combination with contribution data from other processing cores using a reduction operator such as, for example, an addition operator, multiplication operator, maximum operator, and so on. The result of the combination is then distributed back to all of the processing cores. In such a manner, 'all' of the processing cores receive the result of the 'reduction' operation in an allreduce operation.

In the example of FIG. 6A, the processing cores on each compute node (600, 602, 604, 606) are assigned to one of two logical ring domains by the parallel computing application or messaging module invoking the allreduce operation. A logical ring domain is simply a group of processing cores organized for the purpose of establishing a logical ring. Typically, the cores for each node (600, 602, 604, 606) are assigned into the same logical ring domains. For example, in FIG. 6A, processing cores P0 and P2 for each compute node (600, 602, 604, 606) are assigned to logical ring domain 1, and processing cores P1 and P3 for each compute node (600, 602, 604, 606) are assigned to logical ring domain 2. FIG. 6A illustrates a boundary between the two logical ring domains on each compute node (600, 602, 604, 606) using a dotted vertical line.

Figure 6B:
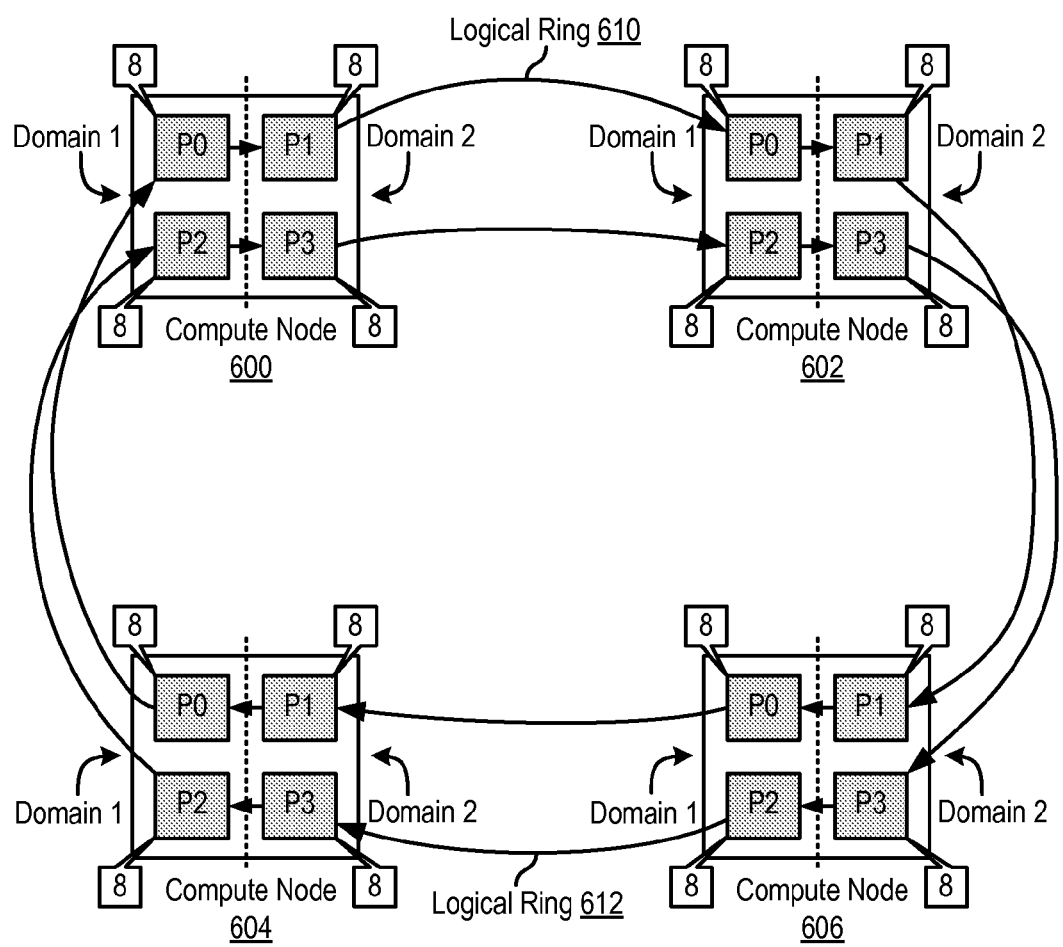
FIG. 6B sets forth a line drawing illustrating exemplary compute nodes of a parallel computer capable of performing an allreduce operation on a plurality of compute nodes of the parallel computer according to embodiments of the present invention.

Turning now to FIG. 6B, FIG. 6B sets forth a line drawing illustrating exemplary compute nodes (600, 602, 604, 606) of a parallel computer capable of performing an allreduce operation on a plurality of compute nodes of the parallel computer according to embodiments of the present invention. The exemplary compute nodes (600, 602, 604, 606) of FIG. 6B are the same compute nodes as in FIG. 6A. In FIG. 6B, the parallel computing application or messaging module invoking the allreduce operation establishes a logical ring for each processing core in the logical ring domains. Because two processing cores are included in each logical ring domain 1 and 2, two logical rings (610, 612) are established. The parallel computing application or messaging module invoking the allreduce operation selects, for each logical ring domain, one of the processing cores assigned to that logical ring domain as the representative core for that logical ring domain. In the example of FIG. 6B, the parallel computing application or messaging module invoking the allreduce operation specifies processing core P0 of each node (600, 602, 604, 606) and processing core P1 of each node (600, 602, 604, 606) as the representative cores for logical ring domains 1 and 2, respectively. The logical ring (610) of FIG. 6B includes representative cores P0 and P1 of each compute node (600, 602, 604, 606). That is, processing core P0 in domain 1 on compute node (600) transmits data to processing core P1 in domain 2 on compute node (600). Processing core P1 in domain 2 on compute node (600) transmits data to processing core P0 in domain 1 on compute node (602). Processing core P0 in domain 1 on compute node (602) transmits data to processing core P1 in domain 2 on compute node (602).

Processing core P1 in domain 2 on compute node (602) transmits data to processing core P1 in domain 2 on compute node (606). Processing core P1 in domain 2 on compute node (606) transmits data to processing core P0 in domain 1 on compute node (606). Processing core P0 in domain 1 on compute node (606) transmits data to processing core P1 in domain 2 on compute node (604). Processing core P1 in domain 2 on compute node (604) transmits data to processing core P0 in domain 1 on compute node (604). Processing core P0 in domain 1 on compute node (604) transmits data to processing core P0 in domain 1 on compute node (600).

Similarly, the parallel computing application or messaging module invoking the allreduce operation specifies processing core P2 of each node (600, 602, 604, 606) and processing core P3 of each node (600, 602, 604, 606) as the representative cores for logical ring domains 1 and 2, respectively. The logical ring (612) of FIG. 6B includes representative cores P2 and P3 of each compute node (600, 602, 604, 606). That is, processing core P2 in domain 1 on compute node (600) transmits data to processing core P3 in domain 2 on compute node (600). Processing core P3 in domain 2 on compute node (600) transmits data to processing core P2 in domain 1 on compute node (602). Processing core P2 in domain 1 on compute node (602) transmits data to processing core P3 in domain 2 on compute node (602). Processing core P3 in domain 2 on compute node (602) transmits data to processing core P3 in domain 2 on compute node (606). Processing core P3 in domain 2 on compute node (606) transmits data to processing core P2 in domain 1 on compute node (606). Processing core P2 in domain 1 on compute node (606) transmits data to processing core P3 in domain 2 on compute node (604). Processing core P3 in domain 2 on compute node (604) transmits data to processing core P2 in domain 1 on compute node (604). Processing core P2 in domain 1 on compute node (604) transmits data to processing core P2 in domain 1 on compute node (600).

In the example of FIG. 6B, the representative cores for each logical ring (610, 612) perform a global allreduce operation using the contribution data for the processing cores included in that logical ring, yielding a global allreduce result for each processing core included in that logical ring. The allreduce is referred to as a 'global' allreduce because the operation involves processing cores that reside on more than one compute node. In FIG. 6B, representative cores P0 and P1 of each compute node (600, 602, 604, 606) included in the logical ring (610) perform a global allreduce operation using their contribution data. Similarly, processing cores P2 and P3 of each compute node (600, 602, 604, 606) included in the logical ring (612) perform a global allreduce operation using their contribution data. A global allreduce operation is an operation in which the data from one or more processing cores of different compute nodes is reduced using a reduction operation, and the results of the reduction operation are distributed to those processing cores.

In the example of FIG. 6B, the representative cores for each logical ring (610, 612) may perform the global allreduce operation by performing, for each logical ring (610, 612), a reduce scatter operation using the contribution data for each representative core included in that logical ring. A reduce scatter operation is a reduction operation in which each processing core participating in the reduction operation receives a different portion of the reduction result. The portion of the reduction result received by each representative core from the reduce scatter operation is the reduce scatter result. To perform a reduce scatter operation in a logical ring, each processing core included in the logical ring must typically pass data to the next core in the ring at least N−1 times where N is the number of processing cores included in the logical ring. Specifically in FIG. 6B, each representative core performs the reduce scatter operation by forwarding its own data along the logical ring to which it belongs to the next representative core in that logical ring and receiving data from the previous representative core in that logical ring during the first iteration. During subsequent iterations, each representative core forwards the data it received during the previous iteration to the next representative core in the logical ring to which it belongs and receives new data from the previous representative core in that logical ring. Because each logical ring (610, 612) of FIG. 6B includes eight cores, the reduce scatter operation is completed in seven iterations, and each representative core ends up with reduce scatter results, which are a portion of the overall global allreduce results.

To complete the global allreduce operation, the representative cores in each logical ring (610, 612) perform an allgather operation using the reduce scatter results for each representative core included in that logical ring. The allgather operation is an operation in which portions of a complete result reside with each processing core, those portions are combined, and the complete result is distributed to the participating processing cores. In the example of FIG. 6B, recall that after performing the reduce scatter, each representative core in logical ring (610) has a portion of the global allreduce result derived from the contribution data of the cores included in logical ring (610). Also, each representative core in logical ring (612) has a portion of the global allreduce result derived from the contribution data of the cores included in logical ring (612). After the cores in the logical ring (610) perform the allgather operation, each representative core P0 and P1 has the entire global allreduce result derived from the contribution data of the other cores included in the logical ring (610). That is, each processing core P0 and P1 has global allreduce results derived from the contribution data of eight processing cores. In the same way, after the cores in the logical ring (612) perform the allgather operation, each representative core P2 and P3 has the entire global allreduce result derived from the contribution data of the other cores included in the logical ring (612). That is, each processing core P2 and P3 has global allreduce results derived from the contribution data of eight processing cores. At this point, however, none of the processing cores in logical ring (610) have reduction results derived from the contributions of the processing cores in logical ring (612), and vice versa.

Figure 6C:
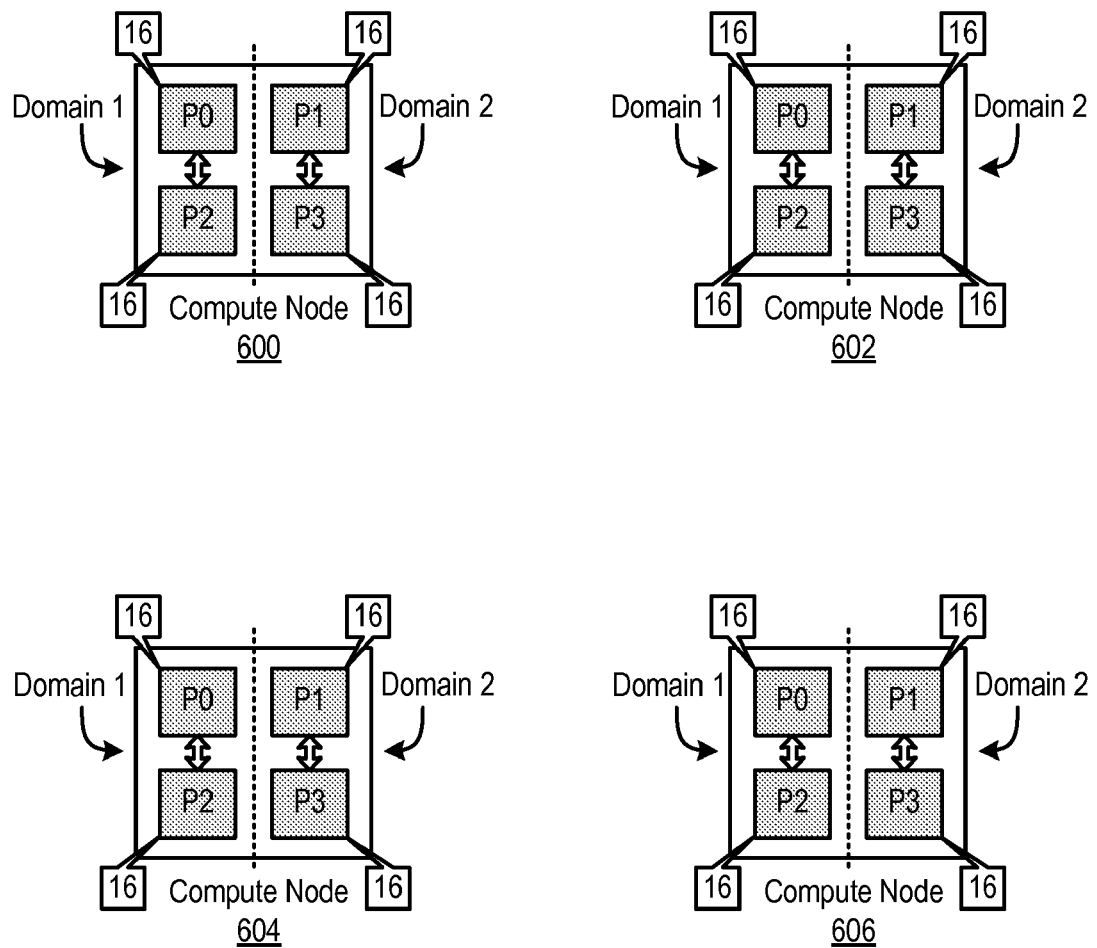
FIG. 6C sets forth a line drawing illustrating exemplary compute nodes of a parallel computer capable of performing an allreduce operation on a plurality of compute nodes of the parallel computer according to embodiments of the present invention.

To describe completion of the allreduce operation for the compute nodes (600, 602, 604, 606), FIG. 6C sets forth a line drawing illustrating exemplary compute nodes (600, 602, 604, 606) of a parallel computer capable of performing an allreduce operation on a plurality of compute nodes of the parallel computer according to embodiments of the present invention. The exemplary compute nodes (600, 602, 604, 606) of FIG. 6C are the same compute nodes as in FIG. 6B after performing a global allreduce operation for each logical ring using the contribution data for the representative cores included in each logical ring. To complete the allreduce operation for the compute nodes (600, 602, 604, 606), the processing cores for each logical ring domain for each compute node perform a local allreduce operation using the global allreduce result for each processing core assigned to that logical ring domain. The allreduce is referred to as a 'local' allreduce because each instance of the operation only involves processing cores that reside on the same compute node. Specifically in FIG. 6C, processing cores P0 and P2 for domain 1 for each compute node (600, 602, 604, 606) perform a local allreduce so that each processing core P0 and P2 has reduction results derived from the contribution data of all sixteen processing cores. In the same way, processing cores P1 and P3 for domain 2 for each compute node (600, 602, 604, 606) perform a local allreduce so that each processing core P1 and P3 has reduction results derived from the contribution data of all sixteen processing cores.

Figure 7:
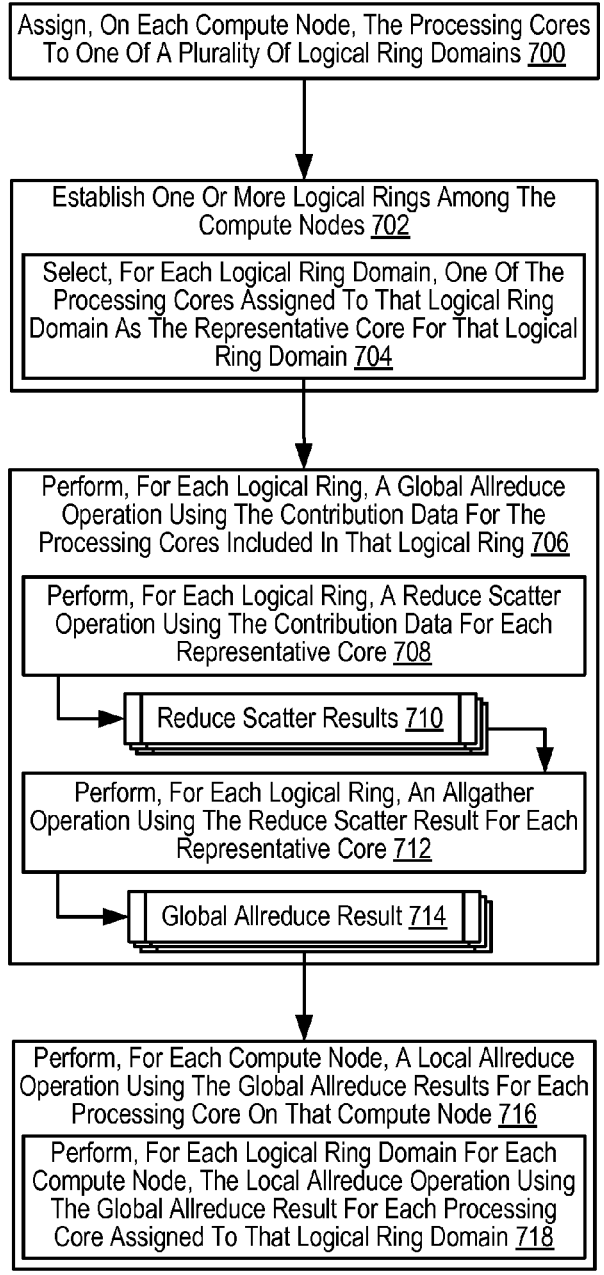
FIG. 7 sets forth a flow chart illustrating an exemplary method for performing an allreduce operation on a plurality of compute nodes of a parallel computer according to the present invention.
Figure 7:
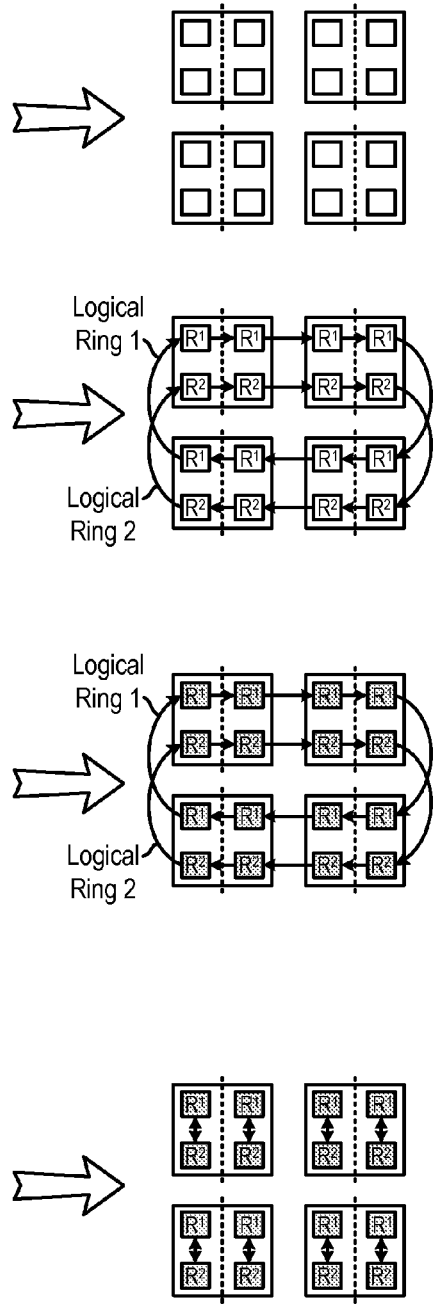

For further explanation, FIG. 7 sets forth a flow chart illustrating an exemplary method for performing an allreduce operation on a plurality of compute nodes of a parallel computer according to the present invention. FIG. 7 illustrates the compute nodes as large squares enclosing smaller squares each representing a processing core. The compute nodes are connected together through a data communications network. In the example of FIG. 7, each compute node illustrated includes four processing cores. FIG. 7 illustrates processing cores as small squares that are inside a larger square representing a compute node. In the example of FIG. 7, each compute node illustrated includes four processing cores. Each processing core has contribution data for the allreduce operation.

The method of FIG. 7 includes assigning (700), on each compute node, the processing cores on that compute node to one of a plurality of logical ring domains. Each logical ring domain uniquely corresponds to one logical ring. Assigning (700), on each compute node, the processing cores on that compute node to one of a plurality of logical ring domains according to the method of FIG. 7 may generally be carried out by the parallel computing application or the messaging module invoking the allreduce operation. In FIG. 7, the processing cores of each compute node are assigned to one of two logical ring domains. FIG. 7 illustrates a boundary between the two logical ring domains on each compute node using a dotted vertical line.

The method of FIG. 7 includes establishing (702) one or more logical rings among the compute nodes, namely logical ring 1 and logical ring 2. Each logical ring includes two processing core from each compute node. Establishing (702) one or more logical rings among the compute nodes, each logical ring including at least one processing core from each compute node according to the method of FIG. 7 may generally be carried out by the parallel computing application or the messaging module invoking the allreduce operation. In the method of FIG. 7, establishing (702) one or more logical rings among the compute nodes includes selecting (704), for each logical ring domain, one of the processing cores assigned to that logical ring domain as the representative core for that logical ring domain. In such a manner, each logical ring includes only one processing core from each logical ring domain on each compute node. FIG. 7 illustrates the representative cores included in logical ring 1 as small square enclosing an '$R^1$.' FIG. 7 illustrates the representative cores included in logical ring 2 as small square enclosing an '$R^2$.'

The method of FIG. 7 includes performing (706), for each logical ring, a global allreduce operation using the contribution data for the processing cores included in that logical ring, yielding a global allreduce result (714) for each processing core included in that logical ring. During the global allreduce operation data is passed between processing cores that reside on the same compute node and processing cores that reside on different compute nodes. Passing data between cores may be carried out using message passing operations or direct memory access ('DMA') operation, and using shared memory operations in embodiments with shared memory architectures.

The representative cores for each logical ring perform (706) a global allreduce operation according to the method of FIG. 7 by performing (708), for each logical ring, a reduce scatter operation using the contribution data for each representative core included in that logical ring, yielding a reduce scatter result (710) for each representative core. As mentioned above, to perform a reduce scatter operation in a logical ring, each representative core included in the logical ring must typically pass data to the next core in the ring at least N–1 times where N is the number of processing cores included in the logical ring. The representative cores may perform (708) the reduce scatter operation according to method of FIG. 7 during the first iteration by forwarding their own contribution data along the logical ring to the next representative core in the logical ring and receiving the contribution data from the previous representative core in the logical ring. During subsequent iterations, each representative core forwards the contribution data that it received during the previous iteration to the next representative core in the logical ring and receives the next contribution data from the previous representative core in the logical ring. Because each logical ring of FIG. 7 includes eight representative cores, each representative core has reduce scatter results (710) for its respective logical ring after seven iterations.

The representative cores for each logical ring further perform (706) a global allreduce operation according to the method of FIG. 7 by performing (712), for each logical ring, an allgather operation using the reduce scatter result for each representative core included in that logical ring, yielding the global allreduce result (714) for each representative core. Similar to the reduce scatter operation in a logical ring, to perform an allgather operation in a logical ring, each representative core included in a logical ring must typically pass data to the next core in that ring at least N−1 times where N is the number of processing cores included in that logical ring. Each representative core for each logical ring may then perform (712) an allgather operation using the reduce scatter results according to the method of FIG. 7 during the first iteration by forwarding their own reduce scatter results (710) along its respective logical ring to the next representative core in that logical ring and receiving the reduce scatter results (710) from the previous representative core in that logical ring. During subsequent iterations, each representative core for each logical ring forwards the reduce scatter results (710) it received during the previous iteration to the next representative core in its respective logical ring and receives the next reduce scatter results (710) from the previous representative core in that logical ring.

The method of FIG. 7 also includes performing (716), for each compute node, a local allreduce operation using the global allreduce results for each processing core on that compute node. In the method of FIG. 7, the processing cores for each compute node perform (716) a local allreduce operation by performing (718), for each logical ring domain for each compute node, the local allreduce operation using the global allreduce result for each processing core assigned to that logical ring domain. The processing cores for each logical ring domain for each compute node may perform (718) the local allreduce operation according to the method of FIG. 7 using shared memory operations, DMA operations, or message passing operations. Because the local allreduce operation typically does not utilize any network resources external to the compute node, network overhead is not involved during the local allreduce operation. After the processing cores for each logical ring domain on each compute node perform (716) a local allreduce operation in such a manner, each of the processing core has the allreduce results derived from the contribution data of all of the processing cores on all of the compute nodes.

The explanations above with respect to FIGS. 6A-C and 7 describe performing an allreduce operation on a plurality of compute nodes using logical rings such that each logical ring includes only a single processing core from each logical ring domain on each compute node. In such a manner, the number of logical rings required to perform the allreduce operation is equal to the number of processing cores assigned to each logical ring domain on a compute node. Rather than including only a single processing core from each domain, each logical ring may include all of the processing cores assigned to a single logical ring domain. For further explanation, FIG. 8A sets forth a line drawing illustrating exemplary compute nodes (800, 802, 804, 806) of a parallel computer capable of performing an allreduce operation on a plurality of compute nodes of the parallel computer according to embodiments of the present invention. The compute nodes (800, 802, 804, 806) are connected through a data communications network (not shown). Specifically, compute node (800) is connected to compute nodes (802, 804). Compute node (802) is connected to compute nodes (800, 806). Compute node (804) is connected to compute nodes (800, 806). Compute node (806) is connected to compute nodes (802, 804).

Figure 8A:
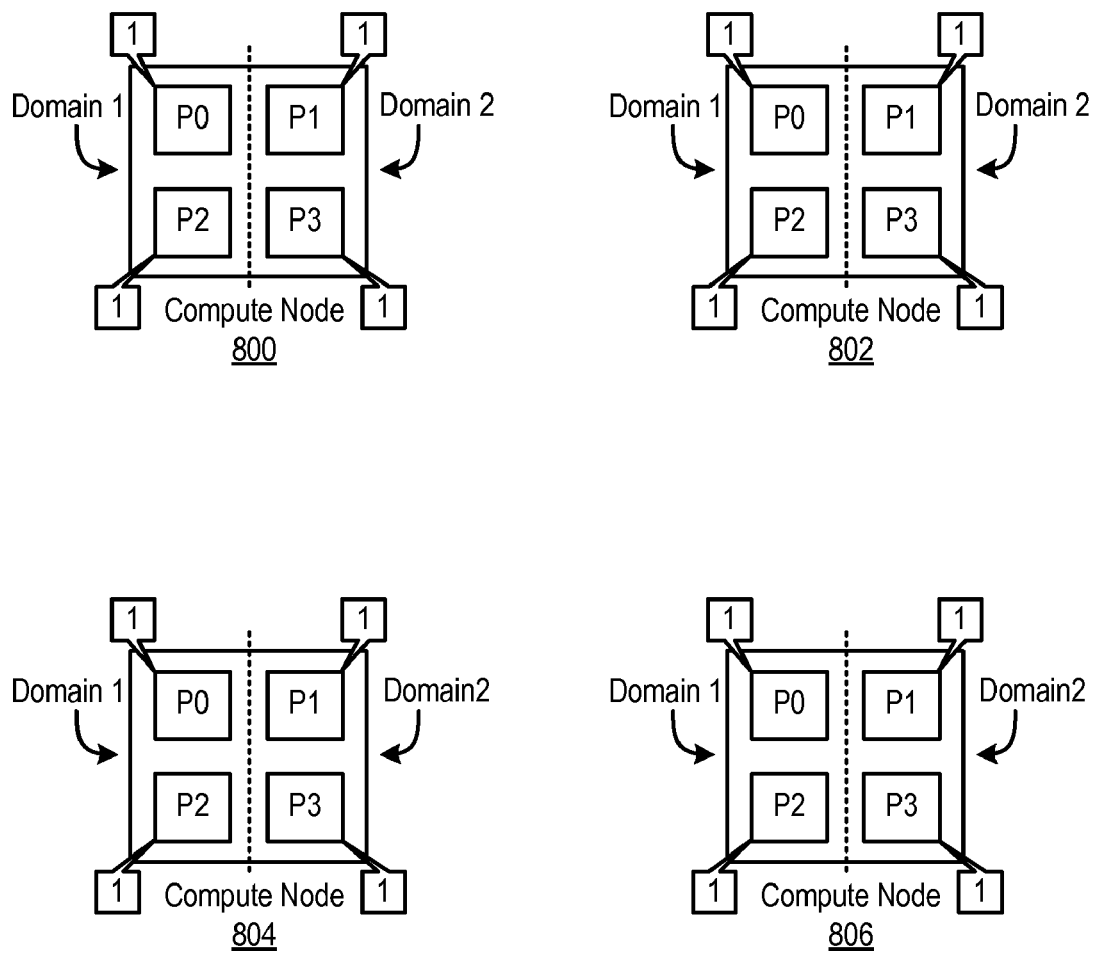
FIG. 8A sets forth a line drawing illustrating exemplary compute nodes of a parallel computer capable of performing an allreduce operation on a plurality of compute nodes of the parallel computer according to embodiments of the present invention.

Each compute node (800, 802, 804, 806) has four processing cores P0, P1, P2, and P3 for use in performing collective parallel operations on the parallel computer. In the example of FIG. 8A, each processing core P0, P1, P2, and P3 of each compute node (800, 802, 804, 806) has its own contribution data for the allreduce operation. The contribution data is data that each processing core provides during the allreduce operation for combination with contribution data from other processing cores using a reduction operator such as, for example, an addition operator, multiplication operator, maximum operator, and so on. The result of the combination is then distributed back to all of the processing cores. In such a manner, 'all' of the processing cores receive the result of the 'reduction' operation in an allreduce operation.

In the example of FIG. 8A, the processing cores on each compute node (800, 802, 804, 806) are assigned to one of two logical ring domains by the parallel computing application or messaging module invoking the allreduce operation. A logical ring domain is simply a group of processing cores organized for the purpose of establishing a logical ring. Typically, the cores for each node (800, 802, 804, 806) are assigned into the same logical ring domains. For example, in FIG. 8A, processing cores P0 and P2 for each compute node (800, 802, 804, 806) are assigned to logical ring domain 1, and processing cores P1 and P3 for each compute node (800, 802, 804, 806) are assigned to logical ring domain 2. FIG. 8A illustrates a boundary between the two logical ring domains on each compute node (800, 802, 804, 806) using a dotted vertical line.

Figure 8B:
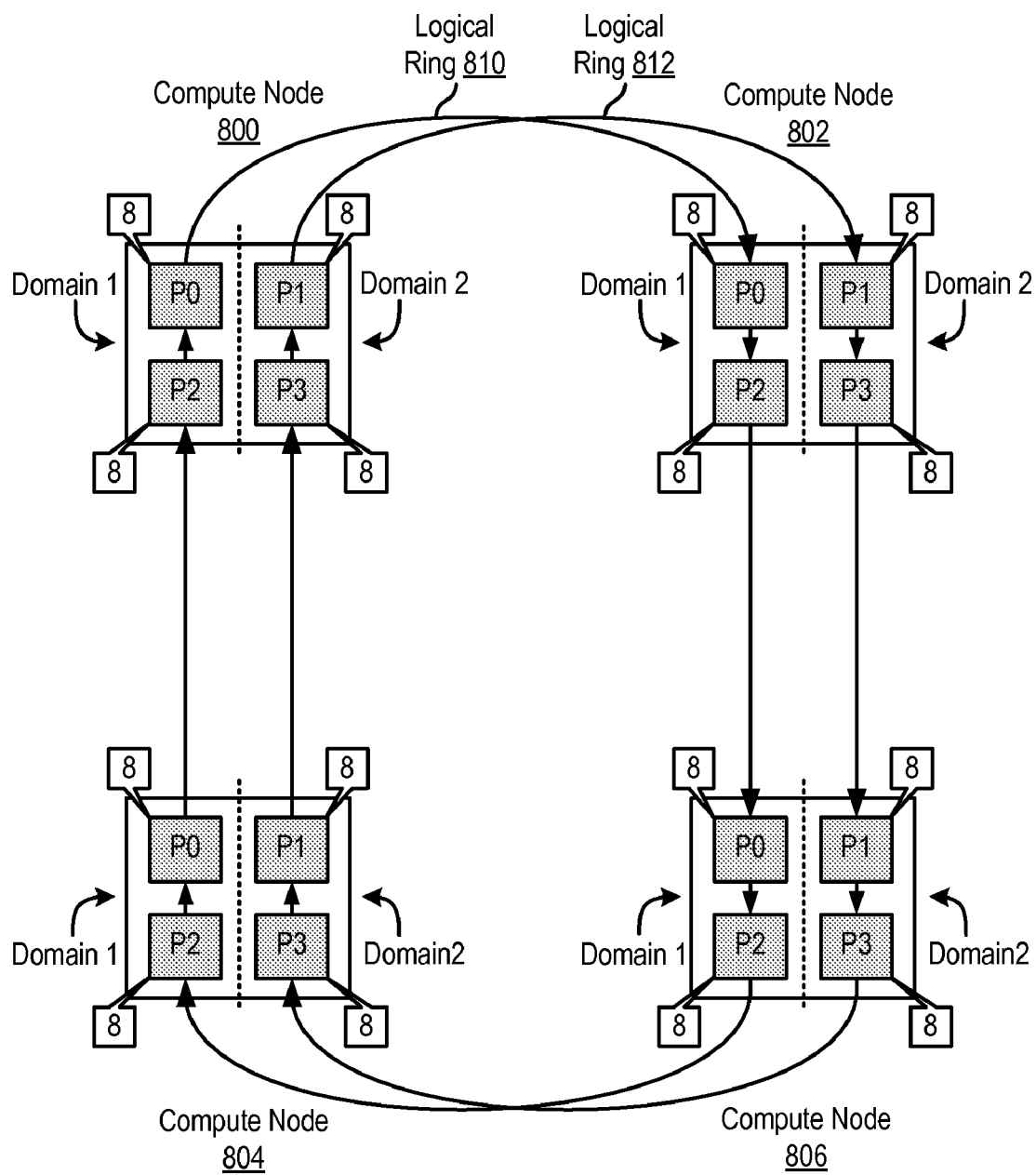
FIG. 8B sets forth a line drawing illustrating exemplary compute nodes of a parallel computer capable of performing an allreduce operation on a plurality of compute nodes of the parallel computer according to embodiments of the present invention.

Turning now to FIG. 8B, FIG. 8B sets forth a line drawing illustrating exemplary compute nodes (800, 802, 804, 806) of a parallel computer capable of performing an allreduce operation on a plurality of compute nodes of the parallel computer according to embodiments of the present invention. The exemplary compute nodes (800, 802, 804, 806) of FIG. 8B are the same compute nodes as in FIG. 8A. In FIG. 8B, the parallel computing application or messaging module invoking the allreduce operation establishes a logical ring for each logical ring domain. Because the processing cores are assigned to two logical ring domains 1 and 2, two logical rings (810, 812) are established.

Each logical ring (810, 812) includes all of the processing cores assigned to the logical ring domain corresponding to the logical ring. Specifically, logical ring (810) includes processing cores P0 and P2 on each node (800, 802, 804, 806). That is, processing core P0 in domain 1 on compute node (800) transmits data to processing core P0 in domain 1 on compute node (802). Processing core P0 in domain 1 on compute node (802) transmits data to processing core P2 in domain 1 on compute node (802). Processing core P2 in domain 1 on compute node (802) transmits data to processing core P0 in domain 1 on compute node (806). Processing core P0 in domain 1 on compute node (806) transmits data to processing core P2 in domain 1 on compute node (806). Processing core P2 in domain 1 on compute node (806) transmits data to processing core P2 in domain 1 on compute node (804). Processing core P2 in domain 1 on compute node (804) transmits data to processing core P0 in domain 1 on compute node (804). Processing core P0 in domain 1 on compute node (804) transmits data to processing core P2 in domain 1 on compute node (800). Processing core P2 in domain 1 on compute node (800) transmits data to processing core P0 in domain 1 on compute node (800).

Similarly, logical ring (812) includes processing cores P1 and P3 on each node (800, 802, 804, 806). That is, processing core P1 in domain 2 on compute node (800) transmits data to processing core P1 in domain 2 on compute node (802). Processing core P1 in domain 2 on compute node (802) transmits data to processing core P3 in domain 2 on compute node (802). Processing core P3 in domain 2 on compute node (802) transmits data to processing core P1 in domain 2 on compute node (806).

Processing core P1 in domain 2 on compute node (806) transmits data to processing core P3 in domain 2 on compute node (806). Processing core P3 in domain 2 on compute node (806) transmits data to processing core P3 in domain 2 on compute node (804). Processing core P3 in domain 2 on compute node (804) transmits data to processing core P1 in domain 2 on compute node (804). Processing core P1 in domain 2 on compute node (804) transmits data to processing core P3 in domain 2 on compute node (800). Processing core P3 in domain 2 on compute node (800) transmits data to processing core P1 in domain 2 on compute node (800).

In the example of FIG. 8B, the processing cores for each logical ring (810, 812) perform a global allreduce operation using the contribution data for the processing cores included in that logical ring, yielding a global allreduce result for each processing core included in that logical ring. In FIG. 8B, processing cores P0 and P2 of each compute node (800, 802, 804, 806) included in the logical ring (810) perform a global allreduce operation using their contribution data. Similarly, processing cores P1 and P3 of each compute node (800, 802, 804, 806) included in the logical ring (812) perform a global allreduce operation using their contribution data. A global allreduce operation is an operation in which the data from one or more processing cores of different compute nodes is reduced using a reduction operation, and the results of the reduction operation are distributed to those processing cores.

In the example of FIG. 8B, the processing cores for each logical ring (810, 812) may perform the global allreduce operation by performing, for each logical ring (810, 812), a reduce scatter operation using the contribution data for each processing core included in that logical ring. As mentioned above, a reduce scatter operation is a reduction operation in which each processing core participating in the reduction operation receives a different portion of the reduction result. The portion of the reduction result received by each processing core from the reduce scatter operation is the reduce scatter result. To perform a reduce scatter operation in a logical ring, each processing core included in the logical ring must typically pass data to the next core in the ring at least N−1 times where N is the number of processing cores included in the logical ring. Specifically in FIG. 8B, each processing core performs the reduce scatter operation by forwarding its own data along the logical ring to which it belongs to the next representative core in that logical ring and receiving data from the previous processing core in that logical ring during the first iteration. During subsequent iterations, each processing core forwards the data it received during the previous iteration to the next processing core in the logical ring to which it belongs and receives new data from the previous processing core in that logical ring. Because each logical ring (810, 812) of FIG. 8B includes eight cores, the reduce scatter operation is completed in seven iterations, and each processing core ends up with reduce scatter results, which are a portion of the overall global allreduce results.

To complete the global allreduce operation, the processing cores in each logical ring (810, 812) perform an allgather operation using the reduce scatter results for each processing core included in that logical ring. As mentioned above, the allgather operation is an operation in which portions of a complete result reside with each processing core, those portions are combined, and the complete result is distributed to the participating processing cores. In the example of FIG. 8B, recall that after performing the reduce scatter, each processing core in logical ring (810) has a portion of the global allreduce result derived from the contribution data of the cores included in logical ring (810). Also, each processing core in logical ring (812) has a portion of the global allreduce result derived from the contribution data of the cores included in logical ring (812). After the cores in the logical ring (810) perform the allgather operation, each representative core P0 and P2 has the entire global allreduce result derived from the contribution data of the other cores included in the logical ring (810). That is, each processing core P0 and P2 has global allreduce results derived from the contribution data of eight processing cores. In the same way, after the cores in the logical ring (812) perform the allgather operation, each processing core P1 and P3 has the entire global allreduce result derived from the contribution data of the other cores included in the logical ring (812). That is, each processing core P1 and P3 has global allreduce results derived from the contribution data of eight processing cores. At this point, however, none of the processing cores in logical ring (810) have reduction results derived from the contributions of the processing cores in logical ring (812), and vice versa.

Figure 8C:
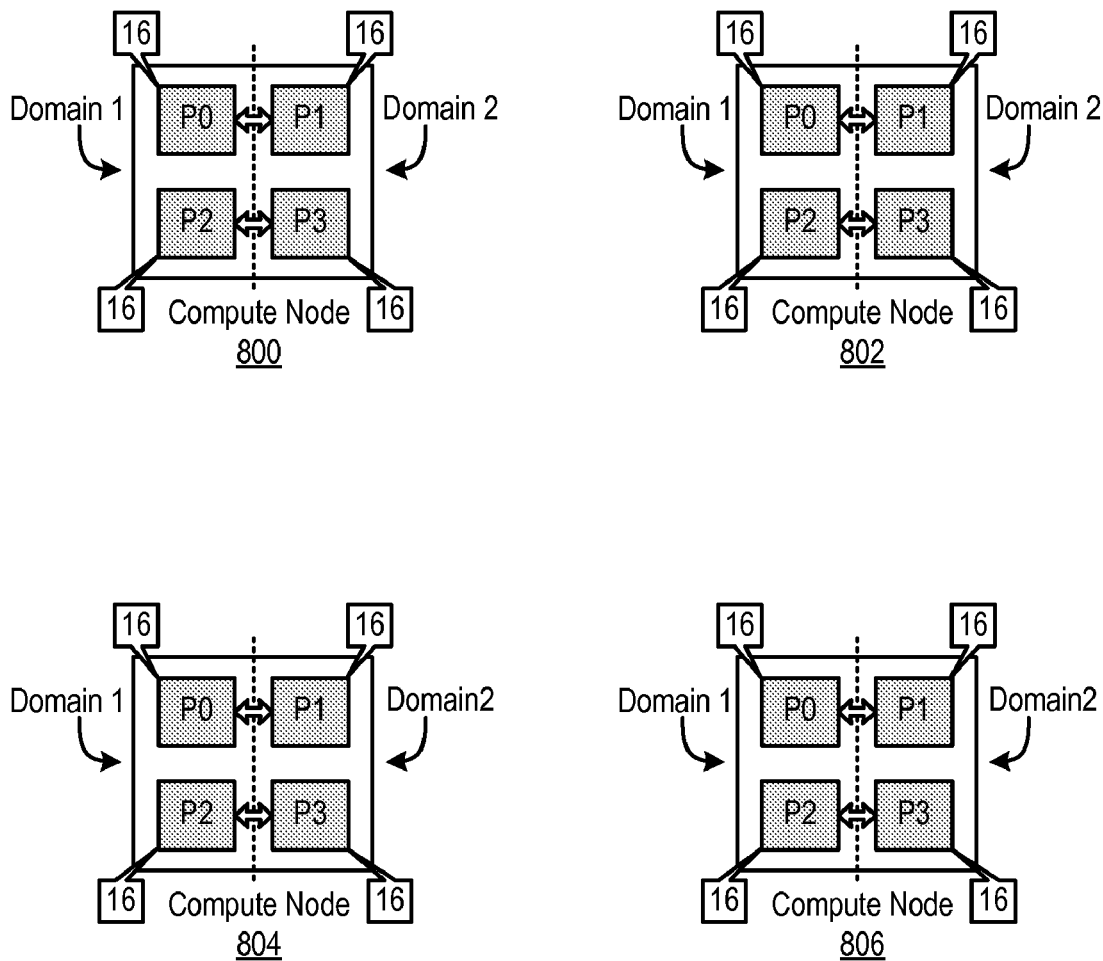
FIG. 8C sets forth a line drawing illustrating exemplary compute nodes of a parallel computer capable of performing an allreduce operation on a plurality of compute nodes of the parallel computer according to embodiments of the present invention.

To describe completion of the allreduce operation for the compute nodes (800, 802, 804, 806), FIG. 8C sets forth a line drawing illustrating exemplary compute nodes (800, 802, 804, 806) of a parallel computer capable of performing an allreduce operation on a plurality of compute nodes of the parallel computer according to embodiments of the present invention. The exemplary compute nodes (800, 802, 804, 806) of FIG. 8C are the same compute nodes as in FIG. 8B after performing a global allreduce operation for each logical ring using the contribution data for the processing cores included in each logical ring. To complete the allreduce operation for the compute nodes (800, 802, 804, 806), the processing core for each compute node (800, 802, 804, 806) perform the local allreduce operation using the global allreduce result for processing cores assigned to different logical ring domains. Specifically in FIG. 8C, processing core P0 in domain 1 and processing core P1 in domain 2 for each compute node (800, 802, 804, 806) perform a local allreduce so that each processing core P0 and P1 has reduction results derived from the contribution data of all sixteen processing cores. In the same way, processing core P2 in domain 1 and processing core P3 in domain 2 for each compute node (800, 802, 804, 806) perform a local allreduce so that each processing core P2 and P3 has reduction results derived from the contribution data of all sixteen processing cores.

Figure 9:
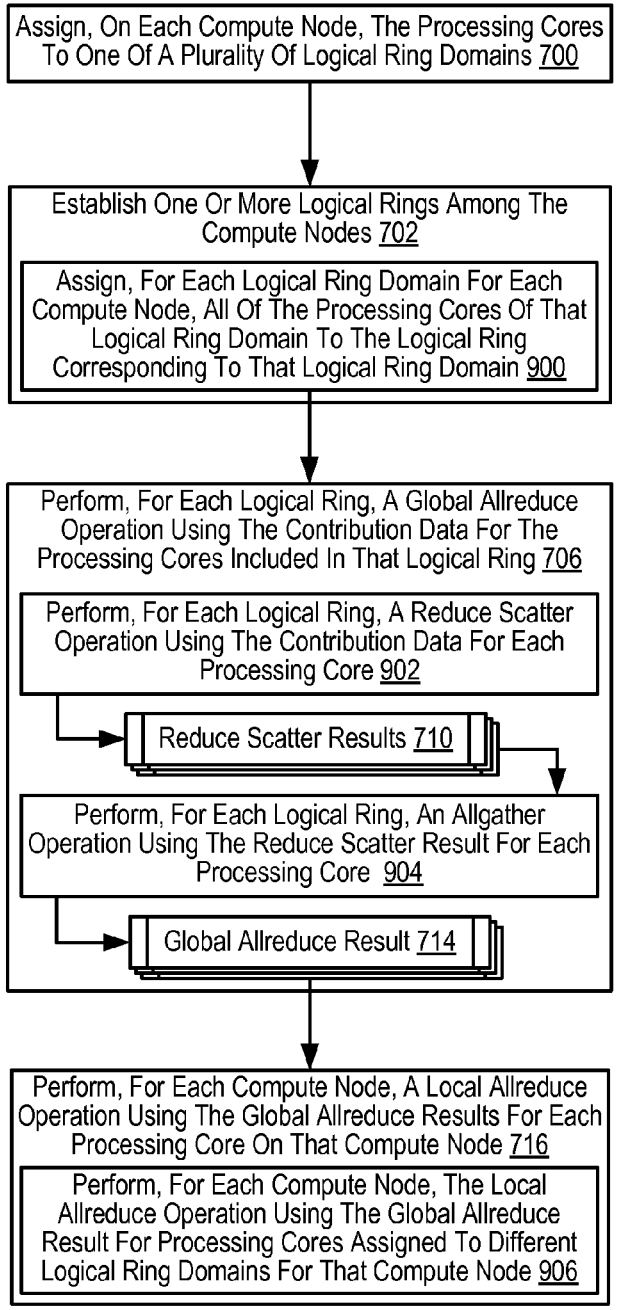
FIG. 9 sets forth a flow chart illustrating a further exemplary method for performing an allreduce operation on a plurality of compute nodes of a parallel computer according to the present invention.
Figure 9:
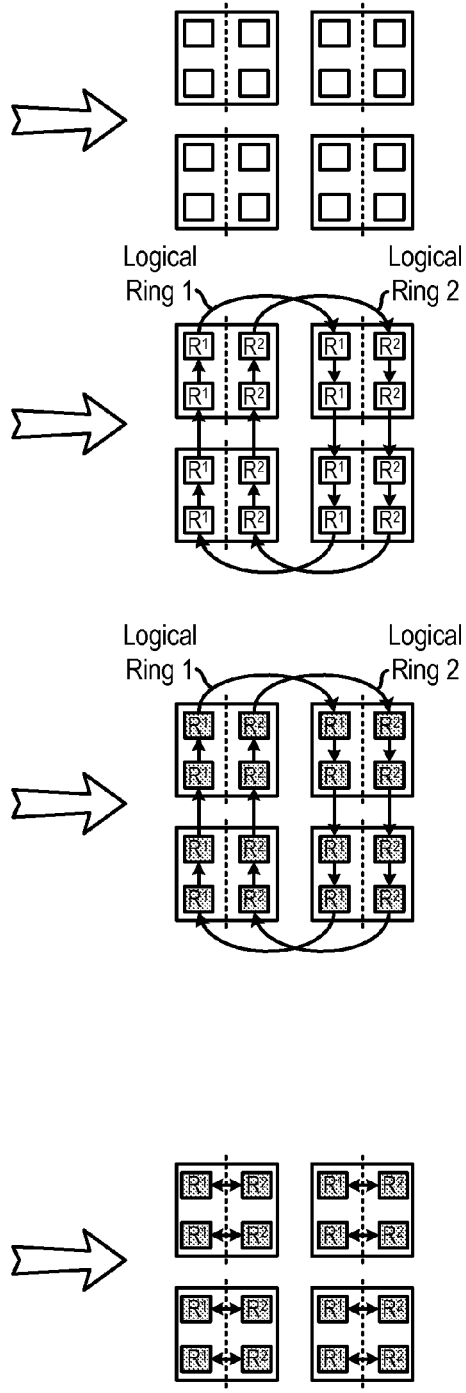

For further explanation, FIG. 9 sets forth a flow chart illustrating an exemplary method for performing an allreduce operation on a plurality of compute nodes of a parallel computer according to the present invention. FIG. 9 illustrates the compute nodes as large squares enclosing smaller squares each representing a processing core. The compute nodes are connected together through a data communications network. In the example of FIG. 9, each compute node illustrated includes four processing cores. FIG. 9 illustrates processing cores as small squares that are inside a larger square representing a compute node. In the example of FIG. 9, each compute node illustrated includes four processing cores. Each processing core has contribution data for the allreduce operation.

The method of FIG. 9 includes assigning (700), on each compute node, the processing cores on that compute node to one of a plurality of logical ring domains. Each logical ring domain uniquely corresponds to one logical ring. Assigning (700), on each compute node, the processing cores on that compute node to one of a plurality of logical ring domains according to the method of FIG. 9 may generally be carried out by the parallel computing application or the messaging module invoking the allreduce operation. In FIG. 9, the processing cores of each compute node are assigned to one of two logical ring domains. FIG. 9 illustrates a boundary between the two logical ring domains on each compute node using a dotted vertical line.

The method of FIG. 9 includes establishing (702) one or more logical rings among the compute nodes, namely logical ring 1 and logical ring 2. Each logical ring includes two processing core from each compute node and uniquely corresponds to one of the logical ring domains to which the processing core are assigned. Establishing (702) one or more logical rings among the compute nodes, each logical ring including at least one processing core from each compute node according to the method of FIG. 9 may generally be carried out by the parallel computing application or the messaging module invoking the allreduce operation. In the method of FIG. 9, establishing (702) one or more logical rings among the compute nodes includes assigning (900), for each logical ring domain for each compute node, all of the processing cores of that logical ring domain to the logical ring corresponding to that logical ring domain. In such a manner, each logical ring includes processing cores from the same logical ring domain on each compute node. FIG. 9 illustrates the representative cores included in logical ring 1 as small square enclosing an '$R^1$.' FIG. 9 illustrates the representative cores included in logical ring 2 as small square enclosing an '$R^2$.'

The method of FIG. 9 includes performing (706), for each logical ring, a global allreduce operation using the contribution data for the processing cores included in that logical ring, yielding a global allreduce result (714) for each processing core included in that logical ring. During the global allreduce operation data is passed between processing cores that reside on the same compute node and processing cores that reside on different compute nodes. Passing data between cores may be carried out using message passing operations or DMA operation, and using shared memory operations in embodiments with shared memory architectures.

The representative cores for each logical ring perform (706) a global allreduce operation according to the method of FIG. 9 by performing (902), for each logical ring, a reduce scatter operation using the contribution data for each processing core included in that logical ring, yielding a reduce scatter result (710) for each processing core. As mentioned above, to perform a reduce scatter operation in a logical ring, each processing core included in the logical ring must typically pass data to the next core in the ring at least N−1 times where N is the number of processing cores included in the logical ring. The processing cores may perform (708) the reduce scatter operation according to method of FIG. 9 during the first iteration by forwarding their own contribution data along the logical ring to the next processing core in the logical ring and receiving the contribution data from the previous processing core in the logical ring. During subsequent iterations, each processing core forwards the contribution data that it received during the previous iteration to the next processing core in the logical ring and receives the next contribution data from the previous processing core in the logical ring. Because each logical ring of FIG. 9 includes eight processing cores, each processing core has reduce scatter results (710) for its respective logical ring after seven iterations.

The representative cores for each logical ring further perform (706) a global allreduce operation according to the method of FIG. 9 by performing (904), for each logical ring, an allgather operation using the reduce scatter result for each processing core included in that logical ring, yielding the global allreduce result (714) for each processing core. Similar to the reduce scatter operation in a logical ring, to perform an allgather operation in a logical ring, each processing core included in a logical ring must typically pass data to the next core in that ring at least N−1 times where N is the number of processing cores included in that logical ring. Each processing core for each logical ring may then perform (904) an allgather operation using the reduce scatter results according to the method of FIG. 9 during the first iteration by forwarding their own reduce scatter results (710) along its respective logical ring to the next processing core in that logical ring and receiving the reduce scatter results (710) from the previous processing core in that logical ring. During subsequent iterations, each processing core for each logical ring forwards the reduce scatter results (710) it received during the previous iteration to the next processing core in its respective logical ring and receives the next reduce scatter results (710) from the previous processing core in that logical ring.

The method of FIG. 9 also includes performing (716), for each compute node, a local allreduce operation using the global allreduce results for each processing core on that compute node. In the method of FIG. 9, the processing cores for each compute node perform (716) a local allreduce operation by performing (906), for each compute node, the local allreduce operation using the global allreduce result for processing cores assigned to different logical ring domains for that compute node. The processing cores for each compute node may perform (906) the local allreduce operation according to the method of FIG. 9 using shared memory operations, DMA operations, or message passing operations. Because the local allreduce operation typically does not utilize any network resources external to the compute node, network overhead is not involved during the local allreduce operation. After the processing cores on each compute node perform (716) a local allreduce operation in such a manner, each of the processing core has the allreduce results derived from the contribution data of all of the processing cores on all of the compute nodes.

Readers will note that the compute nodes in a parallel computer are often connected using a multi-dimensional data communications network. To maximize the use of the data communications network during an allreduce operation according to embodiments of the present invention, a particular embodiment may establish, for each compute node, a logical ring along each network dimension of the data communications network. The number of domains established for the compute nodes in such embodiments would typically correspond to the number of dimensions in the network. For example in a torus network with three dimensions, the processing cores for each compute node may be assigned to three logical ring domains. During the global allreduce operation, which involves inter-node communications, network utilization will be maximized. In such an example, if each compute node has more processing cores than logical ring domains, one or more domains may include more processing cores than other domains.

Exemplary embodiments of the present invention are described largely in the context of a fully functional parallel computer system for performing an allreduce operation on a plurality of compute nodes of the parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of performing an allreduce operation on a plurality of compute nodes of a parallel computer, each compute node comprising at least two processing cores, each processing core having contribution data for the allreduce operation, the method comprising:

establishing one or more logical rings among the compute nodes, each logical ring including at least one processing core from each compute node, wherein in a logical ring, all data that is transferred between processing cores travels from one core of one node to a next core in a next node in a circular manner;

performing, for each logical ring, a global allreduce operation using the contribution data for the processing cores included in that logical ring, yielding a global allreduce result for each processing core included in that logical ring; and performing, for each compute node, a local allreduce operation using the global allreduce results for each processing core on that compute node.

2. The method of claim 1 wherein performing, for each logical ring, a global allreduce operation using the contribution data for the processing cores included in that logical ring, yielding a global allreduce result for each processing core included in that logical ring further comprises:

performing, for each logical ring, a reduce scatter operation using the global allreduce result for each processing core included in that logical ring, yielding reduce scatter result for each processing core; and performing, for each logical ring, an allgather operation using the reduce scatter result for each processing core included in that logical ring, yielding the global allreduce result for each processing core.

3. The method of claim 1 further comprising assigning, on each compute node, the processing cores on that compute node to one of a plurality of logical ring domains.

4. The method of claim 3 wherein:

establishing one or more logical rings among the compute nodes, each logical ring including at least one processing core from each compute node further comprises selecting, for each logical ring domain, one of the processing cores assigned to that logical ring domain as the representative core for that logical ring domain; and performing, for each logical ring, a global allreduce operation using the contribution data for the processing cores included in that logical ring, yielding a global allreduce result for each processing core included in that logical ring further comprises: performing, for each logical ring, a reduce scatter operation using the contribution data for each representative core included in that logical ring, yielding a reduce scatter result for each representative core, and performing, for each logical ring, an allgather operation using the reduce scatter result for each representative core included in that logical ring, yielding the global allreduce result for each representative core; and performing, for each compute node, a local allreduce operation using the global allreduce results for each processing core on that compute node further comprises performing, for each logical ring domain for each compute node, the local allreduce operation using the global allreduce result for each processing core assigned to that logical ring domain.

5. The method of claim 3 wherein:

each logical ring domain corresponds to one of the logical rings;

establishing one or more logical rings among the compute nodes, each logical ring including at least one processing core from each compute node further comprises assigning, for each logical ring domain for each compute node, all of the processing cores of that logical ring domain to the logical ring corresponding to that logical ring domain;

performing, for each logical ring, a global allreduce operation using the contribution data for the processing cores included in that logical ring, yielding a global allreduce result for each processing core included in that logical ring further comprises: performing, for each logical ring, a reduce scatter operation using the contribution data for each processing core included in that logical ring, yielding a reduce scatter result for each processing core, and performing, for each logical ring, an allgather operation using the reduce scatter result for each processing core included in that logical ring, yielding the global allreduce result for each processing core; and performing, for each compute node, a local allreduce operation using the global allreduce results for each processing core on that compute node further comprises performing, for each compute node, the local allreduce operation using the global allreduce result for processing cores assigned to different logical ring domains for that compute node.

6. The method of claim 1 wherein the compute nodes are connected using a data communications network having multiple dimensions and each logical ring corresponds to one of the dimensions of the data communications network.

7. A parallel computer for performing an allreduce operation on a plurality of compute nodes, each compute node comprising at least two processing cores, each processing core having contribution data for the allreduce operation, the parallel computer comprising computer memory operatively coupled to the processing cores of the parallel computer, the computer memory having disposed within it computer program instructions capable of:

establishing one or more logical rings among the compute nodes, each logical ring including at least one processing core from each compute node, wherein in a logical ring, all data that is transferred between processing cores travels from one core of one node to a next core in a next node in a circular manner;

performing, for each logical ring, a global allreduce operation using the contribution data for the processing cores included in that logical ring, yielding a global allreduce result for each processing core included in that logical ring; and performing, for each compute node, a local allreduce operation using the global allreduce results for each processing core on that compute node.

8. The parallel computer of claim 7 wherein performing, for each logical ring, a global allreduce operation using the contribution data for the processing cores included in that logical ring, yielding a global allreduce result for each processing core included in that logical ring further comprises:

performing, for each logical ring, a reduce scatter operation using the global allreduce result for each processing core included in that logical ring, yielding reduce scatter result for each processing core; and performing, for each logical ring, an allgather operation using the reduce scatter result for each processing core included in that logical ring, yielding the global allreduce result for each processing core.

9. The parallel computer of claim 7 wherein the computer memory has disposed within it computer program instructions capable of assigning, on each compute node, the processing cores on that compute node to one of a plurality of logical ring domains.

10. The parallel computer of claim 9 wherein:

establishing one or more logical rings among the compute nodes, each logical ring including at least one processing core from each compute node further comprises selecting, for each logical ring domain, one of the processing cores assigned to that logical ring domain as the representative core for that logical ring domain; and performing, for each logical ring, a global allreduce operation using the contribution data for the processing cores included in that logical ring, yielding a global allreduce result for each processing core included in that logical ring further comprises: performing, for each logical ring, a reduce scatter operation using the contribution data for each representative core included in that logical ring, yielding a reduce scatter result for each representative core, and performing, for each logical ring, an allgather operation using the reduce scatter result for each representative core included in that logical ring, yielding the global allreduce result for each representative core; and performing, for each compute node, a local allreduce operation using the global allreduce results for each processing core on that compute node further comprises performing, for each logical ring domain for each compute node, the local allreduce operation using the global allreduce result for each processing core assigned to that logical ring domain.

11. The parallel computer of claim 9 wherein:

each logical ring domain corresponds to one of the logical rings;

establishing one or more logical rings among the compute nodes, each logical ring including at least one processing core from each compute node further comprises assigning, for each logical ring domain for each compute node, all of the processing cores of that logical ring domain to the logical ring corresponding to that logical ring domain;

performing, for each logical ring, a global allreduce operation using the contribution data for the processing cores included in that logical ring, yielding a global allreduce result for each processing core included in that logical ring further comprises: performing, for each logical ring, a reduce scatter operation using the contribution data for each processing core included in that logical ring, yielding a reduce scatter result for each processing core, and performing, for each logical ring, an allgather operation using the reduce scatter result for each processing core included in that logical ring, yielding the global allreduce result for each processing core; and performing, for each compute node, a local allreduce operation using the global allreduce results for each processing core on that compute node further comprises performing, for each compute node, the local allreduce operation using the global allreduce result for processing cores assigned to different logical ring domains for that compute node.

12. The parallel computer of claim 7 wherein the compute nodes are connected using a data communications network having multiple dimensions and each logical ring corresponds to one of the dimensions of the data communications network.

13. A computer program product for performing an allreduce operation on a plurality of compute nodes of a parallel computer, each compute node comprising at least two processing cores, each processing core having contribution data for the allreduce operation, the computer program product disposed upon a computer readable recordable medium, the computer program product comprising computer program instructions capable of:

establishing one or more logical rings among the compute nodes, each logical ring including at least one processing core from each compute node, wherein in a logical ring, all data that is transferred between processing cores travels from one core of one node to a next core in a next node in a circular manner;

performing, for each logical ring, a global allreduce operation using the contribution data for the processing cores included in that logical ring, yielding a global allreduce result for each processing core included in that logical ring; and performing, for each compute node, a local allreduce operation using the global allreduce results for each processing core on that compute node.

14. The computer program product of claim 13 wherein performing, for each logical ring, a global allreduce operation using the contribution data for the processing cores included in that logical ring, yielding a global allreduce result for each processing core included in that logical ring further comprises:

performing, for each logical ring, a reduce scatter operation using the global allreduce result for each processing core included in that logical ring, yielding reduce scatter result for each processing core; and performing, for each logical ring, an allgather operation using the reduce scatter result for each processing core included in that logical ring, yielding the global allreduce result for each processing core.

15. The computer program product of claim 13 further comprising computer program instructions capable of assigning, on each compute node, the processing cores on that compute node to one of a plurality of logical ring domains.

16. The computer program product of claim 15 wherein:

establishing one or more logical rings among the compute nodes, each logical ring including at least one processing core from each compute node further comprises selecting, for each logical ring domain, one of the processing cores assigned to that logical ring domain as the representative core for that logical ring domain; and performing, for each logical ring, a global allreduce operation using the contribution data for the processing cores included in that logical ring, yielding a global allreduce result for each processing core included in that logical ring further comprises: performing, for each logical ring, a reduce scatter operation using the contribution data for each representative core included in that logical ring, yielding a reduce scatter result for each representative core, and performing, for each logical ring, an allgather operation using the reduce scatter result for each representative core included in that logical ring, yielding the global allreduce result for each representative core; and performing, for each compute node, a local allreduce operation using the global allreduce results for each processing core on that compute node further comprises performing, for each logical ring domain for each compute node, the local allreduce operation using the global allreduce result for each processing core assigned to that logical ring domain.

17. The computer program product of claim 15 wherein:

each logical ring domain corresponds to one of the logical rings;

establishing one or more logical rings among the compute nodes, each logical ring including at least one processing core from each compute node further comprises assigning, for each logical ring domain for each compute node, all of the processing cores of that logical ring domain to the logical ring corresponding to that logical ring domain;

performing, for each logical ring, a global allreduce operation using the contribution data for the processing cores included in that logical ring, yielding a global allreduce result for each processing core included in that logical ring further comprises: performing, for each logical ring, a reduce scatter operation using the contribution data for each processing core included in that logical ring, yielding a reduce scatter result for each processing core, and performing, for each logical ring, an allgather operation using the reduce scatter result for each processing core included in that logical ring, yielding the global allreduce result for each processing core; and performing, for each compute node, a local allreduce operation using the global allreduce results for each processing core on that compute node further comprises performing, for each compute node, the local allreduce operation using the global allreduce result for processing cores assigned to different logical ring domains for that compute node.

18. The computer program product of claim 13 wherein the compute nodes are connected using a data communications network having multiple dimensions and each logical ring corresponds to one of the dimensions of the data communications network.

* * * * *